(12) United States Patent
Okada et al.

(10) Patent No.: US 10,732,056 B2
(45) Date of Patent: Aug. 4, 2020

(54) FORCE SENSOR

(71) Applicant: TRI-FORCE MANAGEMENT CORPORATION, Saitama-ken (JP)

(72) Inventors: Kazuhiro Okada, Saitama-ken (JP); Miho Okada, Saitama-ken (JP); Nobuhisa Nishioki, Saitama-ken (JP)

(73) Assignee: TRI-FORCE MANAGEMENT CORPORATION, Saitama-Ken (JP)

( * ) Notice: Subject to any disclaimer, the term of this patent is extended or adjusted under 35 U.S.C. 154(b) by 0 days.

(21) Appl. No.: 15/757,394

(22) PCT Filed: Jun. 9, 2016

(86) PCT No.: PCT/JP2016/067277
§ 371 (c)(1),
(2) Date: Mar. 5, 2018

(87) PCT Pub. No.: WO2017/212618
PCT Pub. Date: Dec. 14, 2017

(65) Prior Publication Data
US 2018/0259404 A1    Sep. 13, 2018

Related U.S. Application Data

(60) Provisional application No. PCT/JP2016/067277, filed on Jun. 9, 2016.

(51) Int. Cl.
*G01L 1/14*     (2006.01)
*G01L 5/165*    (2020.01)
*G01L 25/00*    (2006.01)

(52) U.S. Cl.
CPC ........... *G01L 1/144* (2013.01); *G01L 5/165* (2013.01); *G01L 25/00* (2013.01)

(58) Field of Classification Search
CPC . G01L 1/14; G01L 1/144; G01L 25/00; G01L 5/16; G01L 5/165; G01P 15/123;
(Continued)

(56) References Cited

U.S. PATENT DOCUMENTS 3,474,526 A * 10/1969 Shoor ................... G01P 15/123
                                                29/434
5,856,620 A *  1/1999 Okada .................. G01P 15/125
                                                73/514.32
(Continued)

FOREIGN PATENT DOCUMENTS

CN          1672023 A      9/2005
CN        102105852 A      6/2011
(Continued)

OTHER PUBLICATIONS

International Preliminary Report on Patentability (IPRP) dated Dec. 11, 2018 for International Application No. PCT/JP2016/067277 (in English).

(Continued)

*Primary Examiner* — Suman K Nath
(74) *Attorney, Agent, or Firm* — Ladas & Parry LLP

(57) ABSTRACT

A force sensor of the present invention includes: a supporting body arranged on an X-Y plane; a deformation body arranged opposite to the supporting body and having a deformation part elastically deformed by an action of a force to be detected; a fixed electrode arranged on the supporting body; a displacement electrode provided to the deformation part of the deformation body in such a manner as to face the fixed electrode with which it forms a capacitive element; and a detection circuit that outputs an electrical signal representing the acting force based on a variation amount of a capacitance value of the capacitive element, wherein the capacitive element includes a first capacitive element and a second capacitive element, and the detection circuit deter- (Continued)

mines whether the force sensor is normally functioning based on a first electrical signal corresponding to a capacitance value of the first capacitive element, a second electrical signal corresponding to a capacitance value of the second capacitive element, and an added electrical signal corresponding to a sum of the capacitance values of the first and second capacitive elements.

7 Claims, 14 Drawing Sheets

(58) Field of Classification Search
CPC .............. G01P 15/125; G01P 15/0802; G01P 15/0922; G01P 2015/0814
USPC ............. 73/862.626, 514.33, 514.34, 514.32
See application file for complete search history.

(56) References Cited

U.S. PATENT DOCUMENTS

| | | | |
|---|---|---|---|
| 5,992,240 A | 11/1999 | Tsuruoka et al. | |
| 6,675,656 B1* | 1/2004 | Plochinger | G01L 1/142 73/718 |
| 7,784,366 B2 | 8/2010 | Daverman et al. | |
| 10,048,156 B2 | 8/2018 | Paulitsch et al. | |
| 10,065,851 B2 | 9/2018 | Bryzek | |
| 2003/0024328 A1* | 2/2003 | Okada | B81B 3/0021 73/862.626 |
| 2010/0231237 A1* | 9/2010 | Deschildre | G01D 5/2417 324/661 |
| 2011/0016973 A1* | 1/2011 | Hamatani | G01P 15/125 73/514.29 |
| 2014/0165724 A1* | 6/2014 | Krylov | G01P 15/097 73/514.15 |
| 2016/0341623 A1* | 11/2016 | Paulitsch | G01L 9/0072 |

FOREIGN PATENT DOCUMENTS

| | | |
|---|---|---|
| CN | 103221795 A | 7/2013 |
| CN | 105829850 A | 8/2016 |
| JP | 9-203681 A | 8/1997 |
| JP | 2004-354049 A | 12/2004 |
| JP | 2005-326293 A | 11/2005 |
| JP | 2008-8688 A | 1/2008 |
| JP | 2010-230631 A | 10/2010 |
| JP | 5667723 B1 | 12/2014 |
| JP | 2015-55473 A | 3/2015 |
| JP | 5853121 B1 | 12/2015 |
| WO | 2004/013593 A1 | 2/2004 |

OTHER PUBLICATIONS

Japanese Office Action dated Nov. 4, 2016 for Application No. JP 2016-556042 with English translation.
Japanese Office Actions dated Apr. 14, 2017 for Application No. JP 2017-040571.
Japanese Office Actions dated Jun. 27, 2017 for Application No. JP 2017-040571.
Espacenet English abstract of JP 9-203681 A.
English translation of JP 5667723 B1.
English translation of JP 2015-55473 A.
English translation of JP 2010-230631 A.
International Search Report (ISR) and Written Opinion dated Jul. 12, 2016 for Application No. PCT/JP2016/067277 (with English translation of the ISR).
Espacenet English abstract of JP 2004-354049 A.
Espacenet English abstract of JP 2017-062147 A which corresponds to JP 5853121 B1.
Espacenet English abstract of JP 2008-8688 A.
Espacenet English abstract of JP 2005-326293 A.
Chinese Office Action dated May 7, 2019 for Application No. CN 201680038010.1.

* cited by examiner

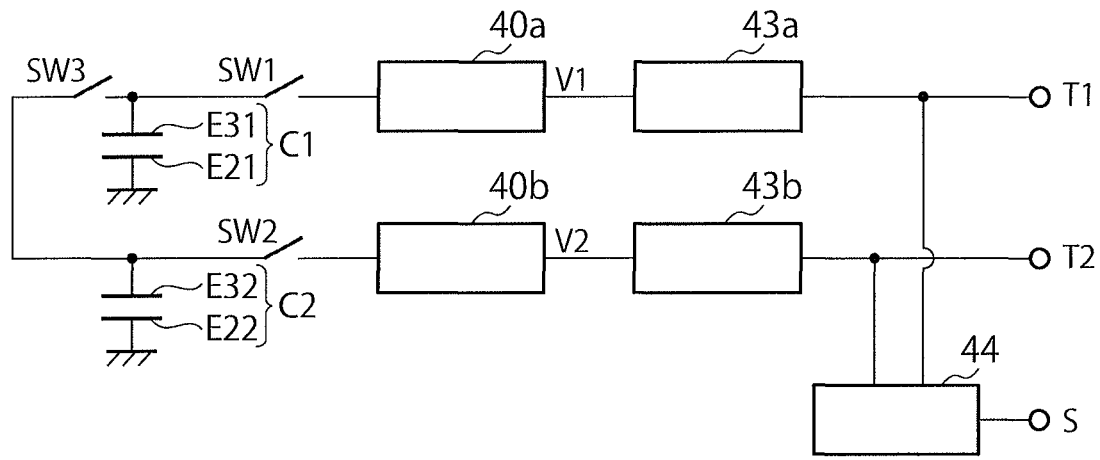
FIG. 3
|  | TIMING 1 | TIMING 2 |
|---|---|---|
| SW1 | ON | ON |
| SW2 | OFF | ON |
| SW3 | ON | OFF |
FIG. 4
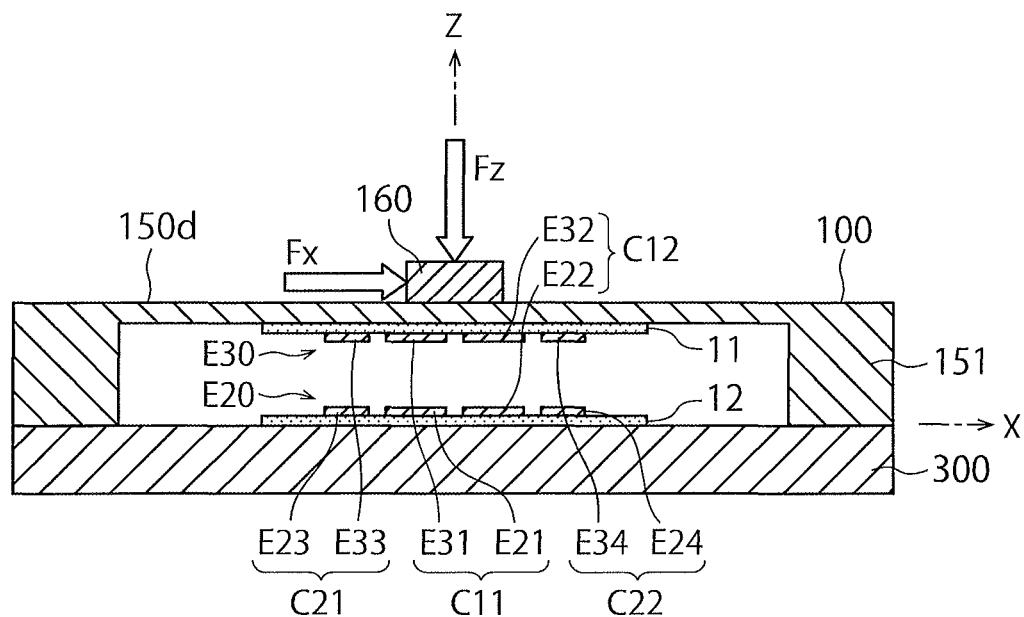
FIG. 5

| | TIMING 1 | TIMING 2 |
|---|---|---|
| SW1 | ON | OFF |
| SW2 | ON | OFF |
| SW3 | ON | OFF |
| SW4 | ON | OFF |
| SW5 | OFF | ON |
| SW6 | OFF | ON |
| SW7 | OFF | ON |
| SW8 | OFF | ON |

|    | C11, C13 | C12, C14 | C21, C23 | C22, C24 | C31, C33 | C32, C34 | C41, C43 | C42, C44 |
|----|----------|----------|----------|----------|----------|----------|----------|----------|
| Fx | −        | +        | 0        | 0        | +        |          | 0        | 0        |
| Fy | 0        | 0        | +        | −        | 0        | 0        | −        | +        |
| Fz | −        | −        | −        | −        | −        | −        | −        | −        |
| Mx | −        | 0        | 0        | 0        | +        | +        | 0        | 0        |
| My | 0        | 0        | +        | +        | 0        | 0        | −        | −        |
| Mz | +        | −        | +        | −        | +        | −        | +        | −        |

FIG. 16

|  | TIMING 1 | TIMING 2 |
|---|---|---|
| SW1-1 | ON | OFF |
| SW1-2 | ON | OFF |
| SW1-3 | ON | OFF |
| SW1-4 | ON | OFF |
| SW2-1 | ON | OFF |
| SW2-2 | ON | OFF |
| SW2-3 | ON | OFF |
| SW2-4 | ON | OFF |
| SW3-1 | ON | OFF |
| SW3-2 | ON | OFF |
| SW3-3 | ON | OFF |
| SW3-4 | ON | OFF |
| SW4-1 | ON | OFF |
| SW4-2 | ON | OFF |
| SW4-3 | ON | OFF |
| SW4-4 | ON | OFF |
| SW101 | OFF | ON |
| SW102 | OFF | ON |
| SW103 | OFF | ON |
| SW104 | OFF | ON |
| SW105 | OFF | ON |
| SW106 | OFF | ON |
| SW107 | OFF | ON |
| SW108 | OFF | ON |
| SW109 | OFF | ON |
| SW110 | OFF | ON |
| SW111 | OFF | ON |
| SW112 | OFF | ON |
| SW113 | OFF | ON |
| SW114 | OFF | ON |
| SW115 | OFF | ON |
| SW116 | OFF | ON |

FIG. 18

|  | TIMING 1 | TIMING 2 |
|---|---|---|
| SW1-1 | ON | OFF |
| SW1-2 | ON | OFF |
| SW1-3 | ON | OFF |
| SW1-4 | ON | OFF |
| SW2-1 | ON | OFF |
| SW2-2 | ON | OFF |
| SW2-3 | ON | OFF |
| SW2-4 | ON | OFF |
| SW3-1 | ON | OFF |
| SW3-2 | ON | OFF |
| SW3-3 | ON | OFF |
| SW3-4 | ON | OFF |
| SW4-1 | ON | OFF |
| SW4-2 | ON | OFF |
| SW4-3 | ON | OFF |
| SW4-4 | ON | OFF |

FORCE SENSOR

RELATED APPLICATION

This application is an application under 35 U.S.C. 371 of International Application No. PCT/JP2016/067277 filed on Jun. 9, 2016, the entire contents of which are incorporated herein by reference.

TECHNICAL FIELD

The present invention relates to force sensors and particularly to a sensor having a function to output, as an electrical signal, force acting in a predetermined axial direction and torque acting around a predetermined axis of rotation.

BACKGROUND ART

A force sensor having a function to output, as an electrical signal, force acting in a predetermined axial direction and torque acting around a predetermined axis of rotation is for example described in Patent Literature 1 and is widely used in force control of industrial robots. Such sensors have been employed in life support robots in recent years and thus high safety is desired. However, for example a force sensor of the current capacitance type includes a mechanical unit, a detection unit of capacitance (detection unit of force), and an electronic circuit including a microcomputer but may disadvantageously fail due to condensation, an impact, an overload, or contamination between a pair of parallel flat plates providing the capacitance.

As a simple method for determining whether a force sensor has failed, it is only required to align the multiple (e.g. three) force sensors described in Patent Literature 1 in parallel and to evaluate a difference of output signals of the force sensors. In this method, each two of the three output signals are compared and the force sensor is determined as normally functioning when the difference between the output signals of each two of the force sensors is within a predetermined range. On the other hand the force sensor is determined as not normally functioning (out of order) when the difference is not within the predetermined range.

CITATION LIST

Patent Literature

Patent Literature 1: JP 2004-354049 A

However, when a method to determine whether a force sensor is normally functioning by using a plurality of force sensors is employed, cost increases according to the number of force sensors. A space required for installing the force sensors also disadvantageously increases.

The present invention has been devised in consideration to the above problems. That is, an object of the present invention is to provide a force sensor capable of determining a failure (determination as to whether normally functioning) while minimizing cost and an installment space.

DISCLOSURE OF INVENTION

A force sensor of the present invention detects force in a Z axis direction in an X-Y-Z three-dimensional coordinate system, the force sensor including: a supporting body arranged on an X-Y plane; a deformation body arranged opposite to the supporting body and having a deformation part elastically deformed by an action of a force to be detected; a fixed electrode arranged on the supporting body; a displacement electrode provided to the deformation part of the deformation body in such a manner as to face the fixed electrode with which it forms a capacitive element; and a detection circuit that outputs an electrical signal representing a force acting on one side of the deformation body and of the supporting body while a load is applied to another side thereof based on a variation amount of a capacitance value of the capacitive element. The capacitive element includes a first capacitive element arranged in a region including the Z axis when viewed from the Z axis direction and a second capacitive element. The detection circuit outputs, as the electrical signal representing the acting force, a first electrical signal corresponding to a capacitance value of the first capacitive element, a second electrical signal corresponding to a capacitance value of the second capacitive element, and an added electrical signal corresponding to a sum of the capacitance values of the first and second capacitive elements, and the detection circuit determines whether the force sensor is normally functioning based on any one of the first electrical signal and the second electrical signal, and the added electrical signal.

According to the present invention, the force measured based on one of the first electrical signal and the second electrical signal and the added electrical signal can be compared to each other and thus the force sensor itself can determine whether the force sensor is normally functioning. This allows for providing a force sensor capable of determining a failure (determination as to whether normally functioning) without using a plurality of force sensors, in other words, while minimizing cost and an installment space.

Preferably, the second capacitive element is arranged in such a manner as to encircle the first capacitive element. Specifically, the first capacitive element has a disk shape when viewed from the Z axis direction and the second capacitive element has a ring shape when viewed from the Z axis direction.

In this case, each of the capacitive elements has a symmetrical shape and thus it is easy to perform processing for measuring the force to be detected based on a variation of capacitance value of each of the capacitive elements.

The displacement electrode and the fixed electrode forming each of the capacitive elements may include various aspects. For example, the displacement electrode includes a first displacement electrode and a second displacement electrode, the fixed electrode includes a first fixed electrode arranged opposite to the first displacement electrode and a second fixed electrode arranged opposite to the second displacement electrode, the first capacitive element is formed by the first displacement electrode and the first fixed electrode, and the second capacitive element is formed by the second displacement electrode and the second fixed electrode.

In this case, it is preferable that an area of one of the first fixed electrode and the first displacement electrode is set larger than an area of the other and an area of one of the second fixed electrode and the second displacement electrode is set larger than an area of the other such that an effective facing area of each of the pairs of electrodes forming the first and the second capacitive elements does not change even when a relative position of the displacement electrode changes relative to the fixed electrode as a result of an action of a force in the Z axis direction.

In the force sensor as described above, the first and the second fixed electrodes may be formed by a common electrode or the first and the second displacement electrodes may be formed by a common electrode.

Preferably, the first capacitive element has a disk shape when viewed from the Z axis direction and the second capacitive element has a ring shape encircling the first capacitive element when viewed from the Z axis direction.

In this case, each of the capacitive elements has a symmetrical shape and thus it is easy to perform processing for measuring the force to be detected based on a variation of capacitance value of each of the capacitive elements.

It is preferable that the acting force in the Z axis direction is measured based on the added electrical signal. The added electrical signal has a larger capacitance value (area of the electrode) that is used for measurement of a force as compared to the first and the second electrical signals and thus has a large variation in the capacitance value and is advantageous from the perspective of S/N.

Preferably, the detection circuit determines whether the force sensor is normally functioning by determining whether "at least one of a difference between a force measured based on the added electrical signal and a force measured based on the first electrical signal and a difference between the force measured based on the added electrical signal and a force measured based on the second electrical signal" is within a predetermined range.

More preferably, the detection circuit outputs, as the electrical signal representing the acting force, both of the first electrical signal and the second electrical signal and determines whether the force sensor is normally functioning by determining whether "at least one of a difference between a force measured based on the added electrical signal and a force measured based on the first electrical signal and a difference between the force measured based on the added electrical signal and a force measured based on the second electrical signal" and "a difference between the force measured based on the first electrical signal and the force measured based on the second electrical signal" are within a predetermined range.

In these cases, whether the force sensor is normally functioning can be surely determined.

Alternatively, a force sensor of the present invention detects force in a Z axis direction and an X axis direction in an X-Y-Z three-dimensional coordinate system, the force sensor including: a supporting body arranged on an X-Y plane; a deformation body arranged opposite to the supporting body and having a deformation part elastically deformed by an action of a force to be detected; a fixed electrode arranged on the supporting body; a displacement electrode provided to the deformation part of the deformation body in such a manner as to face the fixed electrode with which it forms a capacitive element; and a detection circuit that outputs an electrical signal representing a force acting on one side of the deformation body and of the supporting body while a load is applied to another side thereof based on a variation amount of a capacitance value of the capacitive element. The capacitive element includes a first capacitive element on a negative X axis side and a second capacitive element on a positive X axis side arranged while interposing the Y axis when viewed from the Z axis direction and a third capacitive element arranged near the first capacitive element and a fourth capacitive element arranged near the second capacitive element. The detection circuit outputs, as the electrical signal representing the acting force in the X axis direction, a first electrical signal corresponding to "a difference between a sum of capacitance values of the first and the third capacitive elements and a sum of capacitance values of the second and the fourth capacitive elements" and at least one of a second electrical signal corresponding to "a difference between the capacitance values of the first and the second capacitive elements" and a third electrical signal corresponding to "a difference between the capacitance values of the third and the fourth capacitive elements" and determines whether the force sensor is normally functioning based on the first electrical signal and one of the second electrical signal and the third electrical signal.

According to the present invention, the force measured based on the first electrical signal and one of the second electrical signal and the third electrical signal can be compared to each other and thus the force sensor itself can determine whether the force sensor is normally functioning. This allows for providing a force sensor capable of determining a failure (determination as to whether normally functioning) without using a plurality of force sensors, in other words, while minimizing cost and an installment space.

Preferably, the detection circuit determines whether the force sensor is normally functioning by determining whether "at least one of a difference between a force measured based on the first electrical signal and a force measured based on the second electrical signal and a difference between the force measured based on the first electrical signal and a force measured based on the third electrical signal" is within a predetermined range.

More preferably, the detection circuit outputs, as the electrical signal representing the acting force, both of the second electrical signal and the third electrical signal and determines whether the force sensor is normally functioning by determining whether "at least one of a difference between a force measured based on the first electrical signal and a force measured based on the second electrical signal and a difference between the force measured based on the first electrical signal and a force measured based on the third electrical signal" and "a difference between the force measured based on the second electrical signal and the force measured based on the third electrical signal" are within a predetermined range.

In these cases, whether the force sensor is normally functioning can be surely determined.

It is preferable that the acting force in the X axis direction is measured based on the first electrical signal. The first electrical signal has a larger capacitance value (area of the electrode) that is used for measurement of a force as compared to the second and the third electrical signals and thus has a large variation in the capacitance value and is advantageous from the perspective of S/N.

Alternatively, a force sensor of the present invention detects force in a Z axis direction and an X axis direction in an X-Y-Z three-dimensional coordinate system, the force sensor including: a supporting body arranged on an X-Y plane; a deformation body arranged opposite to the supporting body and having a deformation part elastically deformed by an action of a force to be detected; a fixed electrode arranged on the supporting body; a displacement electrode provided to the deformation part of the deformation body in such a manner as to face the fixed electrode with which it forms a capacitive element; and a detection circuit that outputs an electrical signal representing a force acting on one side of the deformation body and of the supporting body while a load is applied to another side thereof based on a variation amount of a capacitance value of the capacitive element. The capacitive element includes a first capacitive element on a negative X axis side and a second capacitive element on a positive X axis side arranged while interposing the Y axis when viewed from the Z axis direction and a third capacitive element arranged near the first capacitive element and a fourth capacitive element arranged near the second capacitive element. The detection circuit outputs, as the electrical signal representing the acting force in the Z axis direction, at least one of a first electrical signal corresponding to "a sum of capacitance values of the first and the second capacitive elements" and "a second electrical signal corresponding to "a sum of capacitance values of the third and the fourth capacitive elements" and an added electrical signal corresponding to "a sum of the capacitance values of the first to fourth capacitive elements" and determines whether the force sensor is normally functioning based on any one of the first electrical signal and the second electrical signal and the added electrical signal.

According to the present invention, the force measured based on one of the first electrical signal and the second electrical signal and the added electrical signal can be compared to each other and thus the force sensor itself can determine whether the force sensor is normally functioning. This allows for providing a force sensor capable of determining a failure (determination as to whether normally functioning) without using a plurality of force sensors, in other words, while minimizing cost and an installment space.

Preferably, the detection circuit determines whether the force sensor is normally functioning by determining whether "at least one of a difference between a force measured based on the added electrical signal and a force measured based on the first electrical signal and a difference between the force measured based on the added electrical signal and a force measured based on the second electrical signal" is within a predetermined range.

More preferably, the detection circuit outputs, as the electrical signal representing the acting force, both of the first electrical signal and the second electrical signal and determines whether the force sensor is normally functioning by determining whether "at least one of a difference between a force measured based on the added electrical signal and a force measured based on the first electrical signal and a difference between the force measured based on the added electrical signal and a force measured based on the second electrical signal" and "a difference between the force measured based on the first electrical signal and the force measured based on the second electrical signal" are within a predetermined range.

In these cases, whether the force sensor is normally functioning can be surely determined.

It is preferable that the acting force in the Z axis direction is measured based on the added electrical signal. The added electrical signal has a larger capacitance value (area of the electrode) that is used for measurement of a force as compared to the first and the second electrical signals and thus has a large variation in the capacitance value and is advantageous from the perspective of S/N.

Preferably, the third capacitive element is arranged on a negative X axis side with respect to the first capacitive element, and the fourth capacitive element is arranged on a positive X axis side with respect to the second capacitive element.

In this case, the first to fourth capacitive elements are arranged symmetrically and thus it is easy to perform processing for measuring the force to be detected based on a variation of capacitance value of each of the capacitive elements.

The displacement electrode and the fixed electrode forming each of the capacitive elements may include various aspects. For example, the displacement electrode includes a first displacement electrode on a negative X axis side and a second displacement electrode on a positive X axis side arranged while interposing a Y axis when viewed from the Z axis direction and a third displacement electrode arranged on the negative X axis side with respect to the first displacement electrode and a fourth displacement electrode arranged on the positive X axis side with respect to the second displacement electrode. The fixed electrode includes a first fixed electrode arranged opposite to the first displacement electrode, a second fixed electrode arranged opposite to the second displacement electrode, a third fixed electrode arranged opposite to the third displacement electrode, and a fourth fixed electrode arranged opposite to the fourth displacement electrode. The first capacitive element is formed by the first displacement electrode and the first fixed electrode, the second capacitive element is formed by the second displacement electrode and the second fixed electrode, the third capacitive element is formed by the third displacement electrode and the third fixed electrode, and the fourth capacitive element is formed by the fourth displacement electrode and the fourth fixed electrode.

In this case, for example, the first fixed electrode and the first displacement electrode have a semicircular shape where a chord extending in parallel with the Y axis is a diameter thereof and an arc is formed on the negative X axis side with respect to the chord when viewed from the Z axis direction and the second fixed electrode and the second displacement electrode have a semicircular shape where a chord extending in parallel with the Y axis is a diameter thereof and an arc is formed on the positive X axis side with respect to the chord when viewed from the Z axis direction. The third fixed electrode and the third displacement electrode have a semi-annular shape surrounding the arcs of the first fixed electrode and the first displacement electrode, respectively, when viewed from the Z axis direction, and the fourth fixed electrode and the fourth displacement electrode have a semi-annular shape surrounding the arcs of the second fixed electrode and the second displacement electrode, respectively, when viewed from the Z axis direction.

In this case, the capacitive elements have symmetrical shapes and thus it is easy to perform processing for measuring the force to be detected based on a variation of capacitance value of each of the capacitive elements.

In this case, it is preferable that an area of one of the first fixed electrode and the first displacement electrode is set larger than an area of the other, an area of one of the second fixed electrode and the second displacement electrode is set larger than an area of the other, an area of one of the third fixed electrode and the third displacement electrode is set larger than an area of the other, and an area of one of the fourth fixed electrode and the fourth displacement electrode is set larger than an area of the other such that an effective facing area of each of the pairs of electrodes forming the first to fourth capacitive elements does not change even when a relative position of the displacement electrode changes relative to the fixed electrode as a result of action of a force in the X axis direction and/or the Z axis direction.

At least two of the first to fourth fixed electrodes may be formed by a common electrode or at least two of the first to fourth displacement electrodes may be formed by a common electrode in the force sensor as described above.

Alternatively, a force sensor of the present invention detects a force in each axial direction and a moment around each axis in an X-Y-Z three-dimensional coordinate system, the force sensor including: a supporting body arranged on an X-Y plane; a first deformation body arranged opposite to the supporting body and having four first deformation parts elastically deformed by an action of a force or a moment to be detected; a fixed electrode arranged on the supporting body corresponding to each of the deformation parts of the first deformation body; a displacement electrode provided to each of the four first deformation parts of the first deformation body in such a manner as to face the fixed electrode with which they form four pairs of capacitive elements; a second deformation body arranged on an opposite side of the supporting body with respect to the first deformation body while facing the first deformation body and having four second deformation parts arranged opposite to the four first deformation parts; a connecting member that connects each of the first deformation parts to the second deformation part corresponding to the first deformation part; and a detection circuit that outputs an electrical signal representing a force or a moment acting on one side of the second deformation body and of the supporting body while a load is applied to another side thereof based on a variation amount of each of capacitance values of the four pairs of capacitive elements. A first pair of capacitive elements out of the four pairs of capacitive elements includes a first capacitive element on a negative X axis side and a second capacitive element on a positive X axis side arranged on a positive Y axis side while interposing a Y axis when viewed from the Z axis direction and a third capacitive element arranged near the first capacitive element and a fourth capacitive element arranged near the second capacitive element. A second pair of capacitive elements out of the four pairs of capacitive elements includes a fifth capacitive element on the positive Y axis side and a sixth capacitive element on a negative Y axis side arranged on the positive X axis side while interposing the X axis when viewed from the Z axis direction and a seventh capacitive element arranged near the fifth capacitive element and an eighth capacitive element arranged near the sixth capacitive element. A third pair of capacitive elements out of the four pairs of capacitive elements includes a ninth capacitive element on the positive X axis side and a tenth capacitive element on the negative X axis side arranged on the negative Y axis side while interposing the Y axis when viewed from the Z axis direction and an eleventh capacitive element arranged near the ninth capacitive element and a twelfth capacitive element arranged near the tenth capacitive element. A fourth pair of capacitive elements out of the four pairs of capacitive elements includes a thirteenth capacitive element on the negative Y axis side and a fourteenth capacitive element on a positive Y axis side arranged on the negative X axis side while interposing the X axis when viewed from the Z axis direction and a fifteenth capacitive element arranged near the thirteenth capacitive element and a sixteenth capacitive element arranged near the fourteenth capacitive element. The detection circuit determines whether the force sensor is normally functioning based on "a force in each of the axial directions and a moment around each of the axes detected based on a variation amount of each of capacitance values of the first to sixteenth capacitive elements" and at least one of "a force in each of the axial directions and a moment around each of the axes detected based on a variation amount of each of capacitance values of the first, the second, the fifth, the sixth, the ninth, the tenth, the thirteenth, and the fourteenth capacitive elements" and "a force in each of the axial directions and a moment around each of the axes detected based on a variation amount of each of capacitance values of the third, the fourth, the seventh, the eighth, the eleventh, the twelfth, the fifteenth, and the sixteenth capacitive elements".

According to the present invention, the force and the moment measured using all of the capacitive elements can be compared to the force and the moment measured using a part of the capacitive elements and thus the force sensor itself can determine whether the force sensor is normally functioning. This allows for providing a force sensor capable of determining a failure (determination as to whether normally functioning) without using a plurality of force sensors, in other words, while minimizing cost and an installment space.

Preferably, the third capacitive element is arranged on the negative X axis side with respect to the first capacitive element, the fourth capacitive element is arranged on the positive X axis side with respect to the second capacitive element, the seventh capacitive element is arranged on the positive Y axis side with respect to the fifth capacitive element, the eighth capacitive element is arranged on the negative Y axis side with respect to the sixth capacitive element, the eleventh capacitive element is arranged on the positive X axis side with respect to the ninth capacitive element, the twelfth capacitive element is arranged on the negative X axis side with respect to the tenth capacitive element, the fifteenth capacitive element is arranged on the negative Y axis side with respect to the thirteenth capacitive element, and the sixteenth capacitive element is arranged on the positive Y axis side with respect to the fourteenth capacitive element. In this case, the first to sixteenth capacitive elements are arranged symmetrically and thus it is easy to perform processing for measuring the force to be detected based on a variation of capacitance value of each of the capacitive elements.

The displacement electrode and the fixed electrode forming each of the capacitive elements may include various aspects. For example, the displacement electrode includes four pairs of displacement electrodes arranged at every 90 degrees around an origin when viewed from the Z axis direction. A first pair of displacement electrodes out of the four pairs of displacement electrodes includes a first displacement electrode on a negative X axis side and a second displacement electrode on a positive X axis side arranged on a positive Y axis side while interposing a Y axis and a third displacement electrode arranged near the first displacement electrode and a fourth displacement electrode arranged near the second displacement electrode, a second pair of displacement electrodes out of the four pairs of displacement electrodes includes a fifth displacement electrode on the positive Y axis side and a sixth displacement electrode on a negative Y axis side arranged on the positive X axis side while interposing the X axis and a seventh displacement electrode arranged near the fifth displacement electrode and an eighth displacement electrode arranged near the sixth displacement electrode, a third pair of displacement electrodes out of the four pairs of displacement electrodes includes a ninth displacement electrode on the positive X axis side and a tenth displacement electrode on the negative X axis side arranged on the negative Y axis side while interposing the Y axis and an eleventh displacement electrode arranged near the ninth displacement electrode and a twelfth displacement electrode arranged near the tenth displacement electrode, and a fourth pair of displacement electrodes out of the four pairs of displacement electrodes includes a thirteenth displacement electrode on the negative Y axis side and a fourteenth displacement electrode on a positive Y axis side arranged on the negative X axis side while interposing the X axis and a fifteenth displacement electrode arranged near the thirteenth capacitive element and a sixteenth displacement electrode arranged near the fourteenth displacement electrode. The fixed electrode includes a first fixed electrode arranged opposite to the first displacement electrode, a second fixed electrode arranged opposite to the second displacement electrode, a third fixed electrode arranged opposite to the third displacement electrode, a fourth fixed electrode arranged opposite to the fourth displacement electrode, a fifth fixed electrode arranged opposite to the fifth displacement electrode, a sixth fixed electrode arranged opposite to the sixth displacement electrode, a seventh fixed electrode arranged opposite to the seventh displacement electrode, an eighth fixed electrode arranged opposite to the eighth displacement electrode, a ninth fixed electrode arranged opposite to the ninth displacement electrode, a tenth fixed electrode arranged opposite to the tenth displacement electrode, an eleventh fixed electrode arranged opposite to the eleventh displacement electrode, a twelfth fixed electrode arranged opposite to the twelfth displacement electrode, a thirteenth fixed electrode arranged opposite to the thirteenth displacement electrode, a fourteenth fixed electrode arranged opposite to the fourteenth displacement electrode, a fifteenth fixed electrode arranged opposite to the fifteenth displacement electrode, and a sixteenth fixed electrode arranged opposite to the sixteenth displacement electrode. The first capacitive element is formed by the first displacement electrode and the first fixed electrode, the second capacitive element is formed by the second displacement electrode and the second fixed electrode, the third capacitive element is formed by the third displacement electrode and the third fixed electrode, the fourth capacitive element is formed by the fourth displacement electrode and the fourth fixed electrode, the fifth capacitive element is formed by the fifth displacement electrode and the fifth fixed electrode, the sixth capacitive element is formed by the sixth displacement electrode and the sixth fixed electrode, the seventh capacitive element is formed by the seventh displacement electrode and the seventh fixed electrode, the eighth capacitive element is formed by the eighth displacement electrode and the eighth fixed electrode, the ninth capacitive element is formed by the ninth displacement electrode and the ninth fixed electrode, the tenth capacitive element is formed by the tenth displacement electrode and the tenth fixed electrode, the eleventh capacitive element is formed by the eleventh displacement electrode and the eleventh fixed electrode, the twelfth capacitive element is formed by the twelfth displacement electrode and the twelfth fixed electrode, the thirteenth capacitive element is formed by the thirteenth displacement electrode and the thirteenth fixed electrode, the fourteenth capacitive element is formed by the fourteenth displacement electrode and the fourteenth fixed electrode, the fifteenth capacitive element is formed by the fifteenth displacement electrode and the fifteenth fixed electrode, and the sixteenth capacitive element is formed by the sixteenth displacement electrode and the sixteenth fixed electrode.

In this case, for example, the first fixed electrode and the first displacement electrode have a semicircular shape where a chord extending in parallel with the Y axis is a diameter thereof and an arc is formed on the negative X axis side with respect to the chord when viewed from the Z axis direction, the second fixed electrode and the second displacement electrode have a semicircular shape where a chord extending in parallel with the Y axis is a diameter thereof and an arc is formed on the positive X axis side with respect to the chord when viewed from the Z axis direction, the third fixed electrode and the third displacement electrode have a semi-annular shape surrounding the arcs of the first fixed electrode and the first displacement electrode, respectively, when viewed from the Z axis direction, and the fourth fixed electrode and the fourth displacement electrode have a semi-annular shape surrounding the arcs of the second fixed electrode and the second displacement electrode, respectively, when viewed from the Z axis direction. The fifth fixed electrode and the fifth displacement electrode have a semicircular shape where a chord extending in parallel with the X axis is a diameter thereof and an arc is formed on the positive Y axis side with respect to the chord when viewed from the Z axis direction, the sixth fixed electrode and the sixth displacement electrode have a semicircular shape where a chord extending in parallel with the X axis is a diameter thereof and an arc is formed on the negative Y axis side with respect to the chord when viewed from the Z axis direction, the seventh fixed electrode and the seventh displacement electrode have a semi-annular shape surrounding the arcs of the fifth fixed electrode and the fifth displacement electrode, respectively, when viewed from the Z axis direction, and the eighth fixed electrode and the eighth displacement electrode have a semi-annular shape surrounding the arcs of the sixth fixed electrode and the sixth displacement electrode, respectively, when viewed from the Z axis direction. The ninth fixed electrode and the ninth displacement electrode have a semicircular shape where a chord extending in parallel with the Y axis is a diameter thereof and an arc is formed on the positive X axis side with respect to the chord when viewed from the Z axis direction, the tenth fixed electrode and the tenth displacement electrode have a semicircular shape where a chord extending in parallel with the Y axis is a diameter thereof and an arc is formed on the negative X axis side with respect to the chord when viewed from the Z axis direction, the eleventh fixed electrode and the eleventh displacement electrode have a semi-annular shape surrounding the arcs of the ninth fixed electrode and the ninth displacement electrode, respectively, when viewed from the Z axis direction, and the twelfth fixed electrode and the twelfth displacement electrode have a semi-annular shape surrounding the arcs of the tenth fixed electrode and the tenth displacement electrode, respectively, when viewed from the Z axis direction. The thirteenth fixed electrode and the thirteenth displacement electrode have a semicircular shape where a chord extending in parallel with the X axis is a diameter thereof and an arc is formed on the negative Y axis side with respect to the chord when viewed from the Z axis direction, the fourteenth fixed electrode and the fourteenth displacement electrode have a semicircular shape where a chord extending in parallel with the X axis is a diameter thereof and an arc is formed on the positive Y axis side with respect to the chord when viewed from the Z axis direction, the fifteenth fixed electrode and the fifteenth displacement electrode have a semi-annular shape surrounding the arcs of the thirteenth fixed electrode and the thirteenth displacement electrode, respectively, when viewed from the Z axis direction, and the sixteenth fixed electrode and the sixteenth displacement electrode have a semi-annular shape surrounding the arcs of the fourteenth fixed electrode and the fourteenth displacement electrode, respectively, when viewed from the Z axis direction.

In this case, the four pairs of capacitive elements are arranged symmetrically and thus it is easy to perform processing for measuring the force to be detected based on a variation of capacitance value of each of the capacitive elements.

It is also preferable that an area of one of the first fixed electrode and the first displacement electrode is set larger than an area of the other, an area of one of the second fixed electrode and the second displacement electrode is set larger than an area of the other, an area of one of the third fixed electrode and the third displacement electrode is set larger than an area of the other, an area of one of the fourth fixed electrode and the fourth displacement electrode is set larger than an area of the other, an area of one of the fifth fixed electrode and the fifth displacement electrode is set larger than an area of the other, an area of one of the sixth fixed electrode and the sixth displacement electrode is set larger than an area of the other, an area of one of the seventh fixed electrode and the seventh displacement electrode is set larger than an area of the other, an area of one of the eighth fixed electrode and the eighth displacement electrode is set larger than an area of the other, an area of one of the ninth fixed electrode and the ninth displacement electrode is set larger than an area of the other, an area of one of the tenth fixed electrode and the tenth displacement electrode is set larger than an area of the other, an area of one of the eleventh fixed electrode and the eleventh displacement electrode is set larger than an area of the other, an area of one of the twelfth fixed electrode and the twelfth displacement electrode is set larger than an area of the other, an area of one of the thirteenth fixed electrode and the thirteenth displacement electrode is set larger than an area of the other, an area of one of the fourteenth fixed electrode and the fourteenth displacement electrode is set larger than an area of the other, an area of one of the fifteenth electrode and the fifteenth displacement electrode is set larger than an area of the other, and an area of one of the sixteenth fixed electrode and the sixteenth displacement electrode is set larger than an area of the other such that an effective facing area of each of the pairs of electrodes forming the first to sixteenth capacitive elements does not change even when a relative position of the displacement electrode relative to the fixed electrode changes as a result of an action of a force in each of the axial directions and a moment around each of the axes in the X-Y-Z three-dimensional coordinate system.

At least two of the first to sixteenth fixed electrodes may be formed by a common electrode or at least two of the first to sixteenth displacement electrodes may be formed by a common electrode in the force sensor as described above.

It is also preferable that the four pairs of capacitive elements are arranged at an equivalent distance from an origin when viewed from the Z axis direction. In this case, each of the pairs of capacitive elements is arranged symmetrically and thus it is further easier to perform processing for measuring the force to be detected based on a variation of capacitance value of each of the capacitive elements.

BRIEF DESCRIPTION OF DRAWINGS

FIG. 3 is a circuit diagram illustrating an exemplary detection circuit used in the force sensor in FIG. 1.

FIG. 4 is a table illustrating ON/OFF connection states of switches included in the detection circuit in FIG. 3.

FIG. 5 is a schematic cross-sectional view of a dual-axis force sensor of a second embodiment of the present invention.

FIG. 16 is a table of a list of variations in capacitance values occurring in capacitive elements when a force in the X, the Y, and the Z axis directions and a moment around the respective axes act on the force sensor in FIG. 10.

FIG. 18 is a table illustrating ON/OFF connection states of switches included in the detection circuit in FIG. 17.

DESCRIPTION OF EMBODIMENTS

<<<§ 1. Example of Single-Axis Force Sensor>>>

Figure 1:
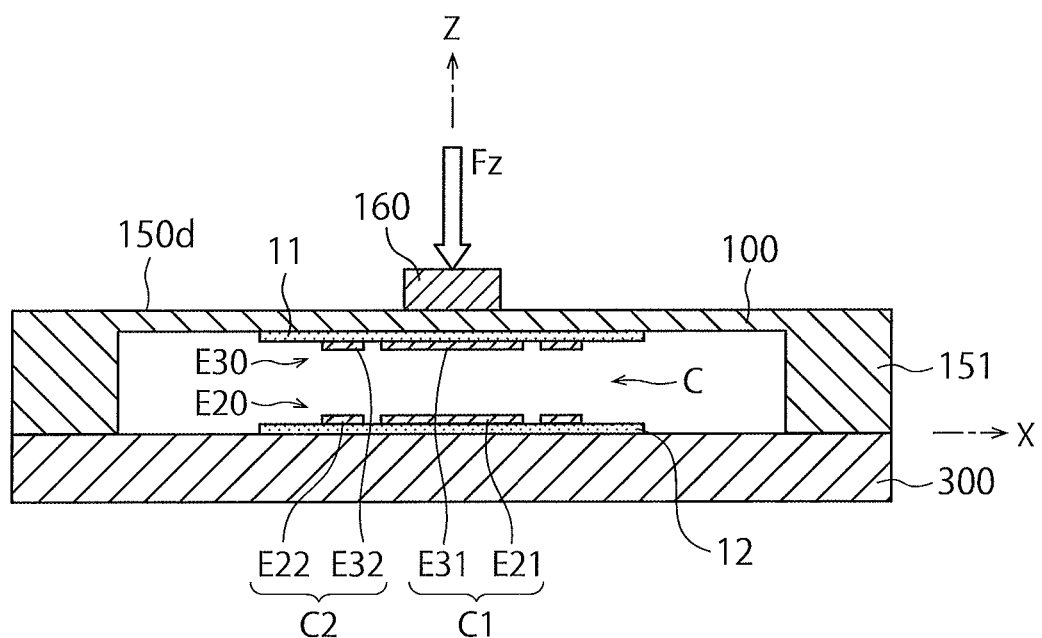
FIG. 1 is a schematic cross-sectional view of a single-axis force sensor of an embodiment of the present invention.
Figure 2:
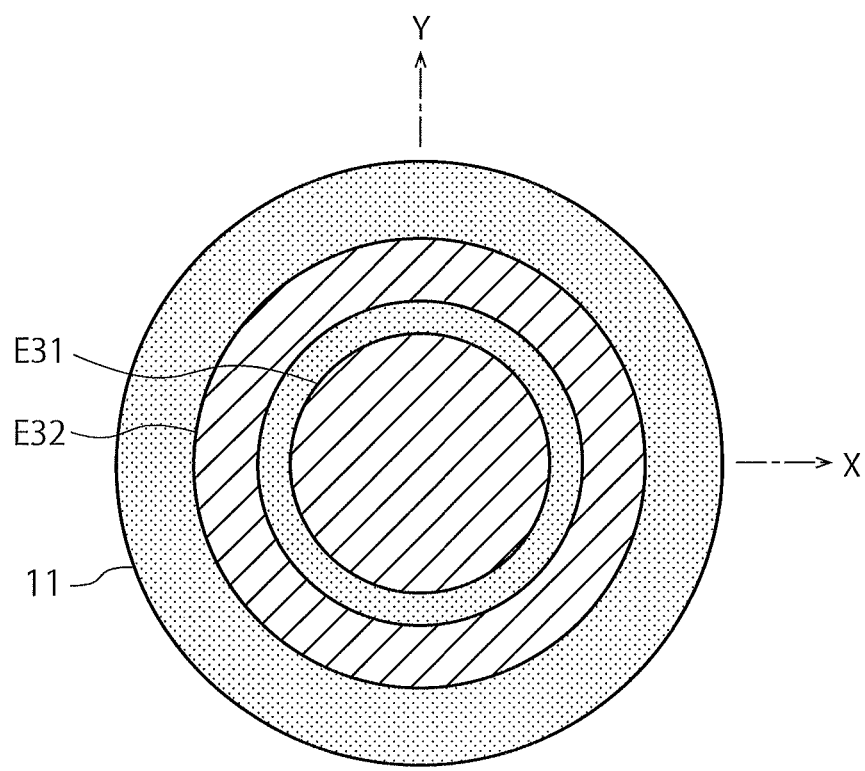
FIG. 2 is a schematic plan view illustrating a displacement electrode of the force sensor in FIG. 1.

A force sensor according to a first embodiment of the present invention will be described with reference to the accompanying drawings. FIG. 1 is a schematic cross-sectional view of a single-axis force sensor of the first embodiment of the present invention. FIG. 2 is a schematic plan view illustrating a displacement electrode of the force sensor in FIG. 1.

As illustrated in FIG. 1, the force sensor according to the present embodiment detects force in a Z axis direction (vertical direction in FIG. 1) in an X-Y-Z three-dimensional coordinate system The force sensor of the present embodiment includes: a supporting body 300 of a flat plate arranged on an X-Y plane; a deformation body 100 having a diaphragm 150d as a deformation part elastically deformed by an action of a force Fz to be detected, the deformation body 100 arranged opposite to the supporting body 300; a fixed electrode E20 arranged on an upper surface of the supporting body 300 via an upper substrate 11; and a displacement electrode E30 provided to the diaphragm 150d via a lower substrate 12 in such a manner as to face the fixed electrode E20, the displacement electrode E30 forming a capacitive element C together with the fixed electrode E20. Here, the upper surface of the supporting body 300 is arranged to match the X-Y plane for convenience of descriptions.

In the embodiment, a force receiving body 160, for receiving a force Fz to be detected, is provided to an upper surface (surface in an upper side in FIG. 1) of the deformation body 100 as illustrated in FIG. 1. Force Fz is transferred to the diaphragm 150d via the force receiving body 160. In a peripheral portion of the deformation body 100 a connection part 151 extending downward is formed. A lower end of the connection part 151 is connected to the upper surface of the supporting body 300. That is, the deformation body 100 is supported by the supporting body 300. When force Fz to be detected acts on the force receiving body 160, the diaphragm 150d is elastically deformed with respect to the supporting body 300. The supporting body 300 and the deformation body 100 of the present embodiment both have a round shape with the center on a Z axis when viewed from above (positive Z axis direction). The force receiving body 160 has a smaller diameter than that of the deformation body 100 and has a disk shape concentric with the supporting body 300 and the deformation body 100. As illustrated in FIG. 1, force Fz acts on an upper surface of the force receiving body 160 in parallel with the Z axis.

In a state where no force is acting on the force receiving body 160, the force receiving body 160 is in an original position with respect to the supporting body 300. When some force acts on the force receiving body 160, the diaphragm 150d having elasticity (flexibility) is elastically deformed and a relative position of the force receiving body 160 to the supporting body 300 changes. Of course, when no force is acting on the force receiving body 160, the force receiving body 160 returns to the original position.

Next, the displacement electrode E30 will be described with reference to FIG. 2. The displacement electrode E30 of the present embodiment includes a first displacement electrode E31 of a disk shape having the center on the Z axis and a second displacement electrode E32 of a ring shape having the center on the Z axis and encircling an outer periphery of the first displacement electrode E31. The fixed electrode E20 of the present embodiment includes a first fixed electrode E21 having the center on the Z axis and a second fixed electrode E22 of a ring shape having the center on the Z axis and encircling an outer periphery of the first fixed electrode E21. The first displacement electrode E31 and the first fixed electrode E21 are arranged opposite to each other and form a first capacitive element C1. The second displacement electrode E32 and the second fixed electrode E22 are arranged opposite to each other and form second capacitive element C2. In the present embodiment, the first displacement electrode E31 and the first fixed electrode E21 have the same shape and the second displacement electrode E32 and the second fixed electrode E22 have the same shape. Of course, in other embodiments, the fixed electrode E20 may be formed by a common electrode while the displacement electrode E30 is formed by the first displacement electrode and the second displacement electrode encircling the first displacement electrode. Alternatively, the displacement electrode E30 may be formed by a common electrode while the fixed electrode E20 is formed by the first fixed electrode and the second fixed electrode encircling the first fixed electrode.

Alternatively, although not illustrated, an area of one of the fixed electrode and the displacement electrode may be set larger than an area of the other such that an effective facing area of the pair of electrodes forming the capacitive element does not change even when a relative position of the displacement electrode relative to the fixed electrode changes as a result of an action of a force in the Z axis direction. This is specifically a state where a projected image of the electrode having a smaller area (e.g. displacement electrode) is completely included within a surface of the other electrode having a larger area (e.g. fixed electrode) when a contour of the electrode having the smaller area is projected on the surface of the electrode having the larger area and thereby an orthogonal projection is formed. When this state is maintained, an effective area of the capacitive element formed by the electrodes is equivalent to an area of the smaller electrode and thus is always constant. That is, a detection accuracy of a force can be enhanced.

When downward force Fz acts on the force receiving body 160 of the force sensor as described above, the diaphragm 150d is curved downward. Along with this, the first displacement electrode E31 and the second displacement electrode E32 are displaced downward. These results in a decrease in a clearance between the first and the second displacement electrodes E31 and E32 and the first and the second fixed electrodes E21 and E22, respectively. Each of capacitance values of the first and the second capacitive elements C1 and C2 thus increases. Based on these variation amounts of capacitance values, the force Fz in the Z axis direction acting on the force receiving body 160 can be detected as a sum of capacitance values of the first and the second capacitive elements C1 and C2.

That is, when the first capacitive element C1 and the second capacitive element C2 are connected in parallel, the force Fz in the Z axis direction applied to the force receiving body 160 can be measured based on the following mathematical formula. In the following mathematical formula, symbols C1 and C2 represent capacitance values of the first and the second capacitive elements C1 and C2, respectively. Note that although the force and the capacitance value are connected by a sign "=", these are different physical quantities and thus actually the force Fz is measured after performing predetermined conversion. Symbol Fz1 represents force Fz that is measured based on the right side of the following mathematical formula and is for distinguishing itself from force Fz measured based on other mathematical formulas described later.

$$Fz1 = C1 + C2 \qquad \text{[Mathematical Formula 1]}$$

The force Fz in the Z axis direction applied to the force receiving body 160 may be measured based on only the first capacitive element C1 or based on only the second capacitive element C2. That is, force F can be measured also by the following Fz2 or Fz3.

$$Fz2 = C1$$

$$Fz3 = C2 \qquad \text{[Mathematical Formulas 2]}$$

In the present invention, Fz1 to Fz3 as described above are used upon determining whether the force sensor is normally functioning. Specifically, force Fz is measured based on the mathematical formulas of Fz2 and Fz3 while the first capacitive element C1 and the second capacitive element C2 are separated. Then whether a difference between Fz1 and Fz2 or Fz3 is within a predetermined range and whether a difference between Fz2 and Fz3 is within a predetermined range are evaluated. When all of the differences are within the predetermined range, the force sensor is determined as normally functioning. On the contrary, when any of the differences is out of the predetermined range, the force sensor is determined as not normally functioning (out of order).

Note that Fz2 and Fz3 do not completely correspond to each other due to the structure of the displacement electrodes. This is because the force receiving body 160 is provided to a region of the diaphragm 150d including the Z axis (axis of an action of a force Fz), that is, a region corresponding to the first displacement electrode E31 and thus downward displacement of the first displacement electrode E31 is larger than downward displacement of the second displacement electrode E32 when downward force Fz acts on the force receiving body 160, for example. Therefore, a variation amount of a capacitance value of the first capacitive element C1 is larger than a variation amount of a capacitance value of the second capacitive element C2. This also applies to a case where upward force Fz acts on the force receiving body 160. In the force sensor of the present embodiment, setting the aforementioned predetermined range in consideration to a difference between the variation amounts of capacitance values of the capacitive elements allows for properly determining whether the force sensor is normally functioning.

Note that, when capacitance values of the first and the second capacitive elements C1 and C2 are equivalent in an initial state where force Fz is not acting on the force receiving body 160, values of Fz2 and Fz3 are substantially a half a value of Fz1 as apparent from the right sides of the aforementioned [Mathematical Formula 1] and [Mathematical Formulas 2]. Therefore, upon comparison between Fz1 and Fz2 or Fz1 and Fz3, processing for appropriate execution of the comparison is performed such as multiplying Fz2 or Fz3 by two. This processing is to be appropriately performed according to capacitance values of the first and the second capacitive elements C1 and C2.

Note that force acting on the force receiving body 160 can be measured by Fz2 or Fz3 but is measured with a higher accuracy by Fz1. This is because a capacitance value (area of the electrode) that is used for measurement of force is larger as compared to the case of Fz2 or Fz3 and thus a variation of capacitance value is also large, resulting in advantage from the perspective of S/N.

The above determination method will be described based on an actual detection circuit included in the force sensor of the present embodiment.

FIG. 3 is a circuit diagram illustrating an exemplary detection circuit for detecting force Fz in the Z axis direction applied to the force receiving body 160 in the force sensor in FIG. 1. FIG. 4 is a table illustrating ON/OFF connection states of switches included in the detection circuit in FIG. 3.

As illustrated in FIG. 3, the first capacitive element C1 is selectively connected to the first C/V convertor 40a via a switch SW1 and the second capacitive element C2 is selectively connected to the second C/V convertor 40b via a switch SW2. The first capacitive element C1 and the second capacitive element C2 are selectively connected to each other via a switch SW3. C/V convertors 40a and 40b are circuits that convert capacitance values of the capacitive elements C1 and C2 to voltage values V1 and V2, respectively. The voltage values V1 and V2 after conversion correspond to the capacitance values of the capacitive elements C1 and C2. These voltage values V1 and V2 are subjected to signal processing by first and second signal processing units 43a and 43b, respectively, and then output from output terminals T1 and T2 as the aforementioned Fz1 to Fz3. The output signals from the first and the second signal processing units 43a and 43b are connected to a comparison unit 44 that compares the output signals. Based on an output signal from the comparison unit 44, whether the force sensor is normally functioning is determined.

In order to detect force Fz in the Z axis direction applied to the force receiving body 160, it is only required to control connection states of the switches SW1 to SW3 as described in a column of timing 1 in FIG. 4. That is, the switches SW1 and SW3 are turned on (connected) while the switch SW2 is turned off (disconnected). As a result of this, the outputs V1 and V2 from the first and the second C/V convertors 40a and 40b are represented by the following mathematical formulas.

$$V1 = C1 + C2$$

$$V2 = 0 \qquad \text{[Mathematical Formulas 3]}$$

From the above, V1 corresponds to "Fz1" (see [Mathematical Formula 1]) and thus force Fz can be measured in the connection states of the timing 1 in FIG. 4.

Next, in order to determine whether the force sensor is normally functioning, it is only required to control connection states of the switches SW1 to SW3 as described in a column of timing 2 in FIG. 4. That is, the switches SW1 and SW2 are turned on (connected) while the switch SW3 is turned off (disconnected). As a result of this, the outputs V1 and V2 from the first and the second C/V convertors 40a and 40b are represented by the following mathematical formulas.

$$V1 = C1$$

$$V2 = C2 \qquad \text{[Mathematical Formulas 4]}$$

From the above, V1 corresponds to "Fz2" and V2 corresponds to "Fz3" (see [Mathematical Formulas 2]) and thus Fz2 and Fz3 can be measured in the connection states of the timing 2 in FIG. 4.

The comparison unit 44 in FIG. 3 further evaluates (a) whether "Fz1−Fz2" is within a predetermined range and (b) whether "Fz2−Fz3" is within a predetermined range. When at least one of the conditions (a) and (b) is not satisfied, the force sensor is determined as not normally functioning (out of order). In this case, a failure determination signal representing determination of failure is sent from an output terminal S in FIG. 3.

Switching between the timing 1 and the timing 2 of the switches SW1 to SW3 may be performed by a microcomputer. The connection states of the timing 1 and the timing 2 may be alternately switched by the same periods of time for example. Alternatively, the connection states of the timing 1 and the connection states of the timing 2 may be switched at a ratio of 10 to 1 or 100 to 1 in terms of a period of time for example and thereby measurement time of force Fz (timing 1) may be extended while time for failure diagnosis (timing 2) may be relatively shortened. The force Fz acting on the force receiving body 160 can be measured by any of Fz1 to Fz3. However, a wider electrode area has a higher detection sensitivity and is superior in terms of stationary noise and thus it is preferable to measure by Fz1.

The comparison unit 44 in FIG. 3 may evaluate (c) whether "Fz1−Fz3" is within a predetermined range and (b) whether "Fz2−Fz3" is within a predetermined range and determine that the force sensor is not normally functioning (out of order) when at least one of the conditions (c) and (b) is not satisfied. Alternatively, the comparison unit 44 may evaluate (a) whether "Fz1−Fz2" is within a predetermined range and (c) whether "Fz1−Fz3" is within a predetermined range and determine that the force sensor is not normally functioning (out of order) when at least one of the conditions (a) and (c) is not within the predetermined range.

According to the force sensor of the present embodiment as described above, comparing force Fz1 to Fz3 that are measured based on an electrical signal corresponding to C1+C2, an electrical signal corresponding to C1, and an electrical signal corresponding to C2, respectively, allows the force sensor to determine by itself whether the force sensor is normally functioning. This allows for providing a force sensor capable of determining a failure (determination as to whether normally functioning) without using a plurality of force sensors, in other words, while minimizing cost and an installment space.

Specifically, the detection circuit determines whether the force sensor is normally functioning by determining whether "a difference between force Fz1 measured based on the electrical signal corresponding to C1+C2 and force Fz2 measured based on the electrical signal corresponding to C1" and "a difference between force Fz2 measured based on the electrical signal corresponding to C1 and force Fz3 measured based on the electrical signal corresponding to C2" are within a predetermined range. This allows for surely determining whether the force sensor is normally functioning.

In the present embodiment, the first capacitive element C1 has a disk shape when viewed from the Z axis direction and the second capacitive element C2 has a ring shape encircling the first capacitive element C1 when viewed from the Z axis direction. Therefore, each of the capacitive elements C1 and C2 has a symmetrical shape and thus it is easy to perform processing for measuring the force Fz to be detected based on a variation of capacitance value of each of the capacitive elements C1 and C2.

<<<§ 2. Example of Dual-Axis Force Sensor>>>

Next, an example where the above principles of failure diagnosis are applied to a dual-axis force sensor will be described.

Figure 6:
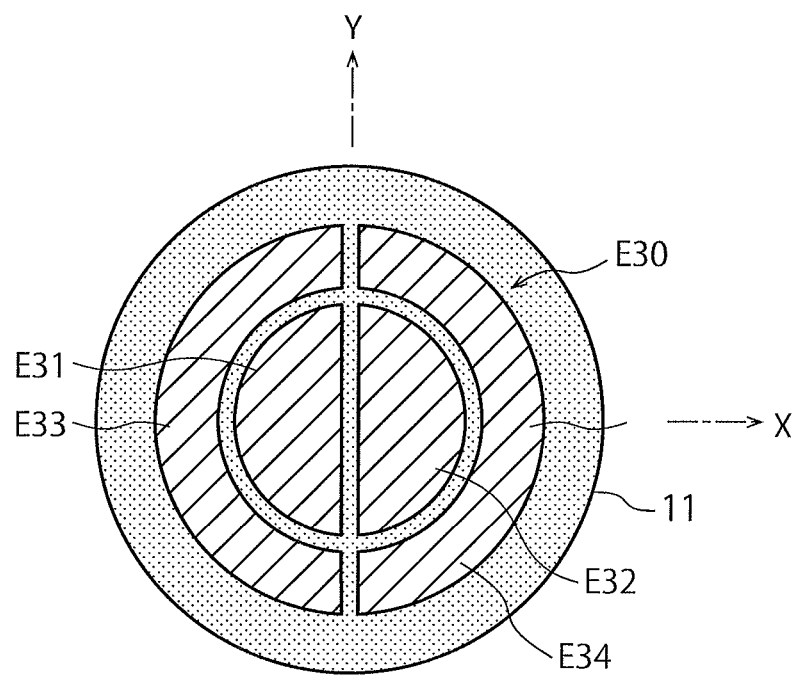
FIG. 6 is a schematic plan view illustrating displacement electrodes of the force sensor in FIG. 5.

The dual-axis force sensor described herein is capable of detecting two types of force including force Fz in the Z axis direction and force Fx in the X axis direction acting on the force receiving body 160. FIG. 5 is a schematic cross-sectional view of a dual-axis force sensor of a second embodiment of the present invention. FIG. 6 is a schematic plan view illustrating displacement electrodes of the force sensor in FIG. 5.

As illustrated in FIGS. 5 and 6, the force sensor of the present embodiment detects force in the Z axis direction (vertical direction in FIG. 1) and force in the X axis direction (horizontal direction in FIG. 1) in an X-Y-Z three-dimensional coordinate system. This force sensor has a structure substantially similar to that of the single-axis force sensor according to the first embodiment. That is, the force sensor includes: a supporting body 300 of a flat plate arranged on an X-Y plane; a deformation body 100 having a diaphragm 150$d$ as a deformation part elastically deformed by an action of a force Fz or force Fx to be detected, the deformation body 100 arranged opposite to an upper surface of the supporting body 300; a fixed electrode E20 arranged on the upper surface of the supporting body 300 via an upper substrate 11; and a displacement electrode E30 provided to the diaphragm 150$d$ via a lower substrate 12 in such a manner as to face the fixed electrode E20, the displacement electrode E30 forming a capacitive element C together with the fixed electrode E20.

In the embodiment, a force receiving body 160, for receiving force Fz and force Fx to be detected, is provided on the upper surface (surface in an upper side in FIG. 5) of the deformation body 100 as illustrated in FIG. 5. Force Fz and Fx are transferred to the diaphragm 150$d$ via the force receiving body 160. In a peripheral portion of the deformation body 100 a connection part 151 extending downward is formed. A lower end of the connection part 151 is connected to the upper surface of the supporting body 300. That is, the deformation body 100 is supported by the supporting body 300. When force Fz and force Fx to be detected act on the force receiving body 160, the diaphragm 150$d$ is elastically deformed with respect to the supporting body 300. The supporting body 300 and the deformation body 100 of the present embodiment both have a round shape with the center on a Z axis when viewed from above (positive Z axis direction). The force receiving body 160 has a smaller diameter than that of the deformation body 100 and has a disk shape concentric with the supporting body 300 and the deformation body 100. Force Fz acts on an upper surface of the force receiving body 160 in parallel with the Z axis. Force Fx also acts on a side surface of the force receiving body 160.

The force sensor of the present embodiment is different from the force sensor of the first embodiment with respect to a structure of the capacitive element. That is, the capacitive element of the present embodiment includes a first capacitive element C11 on a negative X axis side and a second capacitive element C12 on a positive X axis side arranged while interposing a Y axis when viewed from the Z axis direction and a third capacitive element C21 arranged on a negative X axis side with respect to the first capacitive element C11 and a fourth capacitive element C22 arranged on a positive X axis side with respect to the second capacitive element C12.

Specifically, as illustrated in FIG. 6, the displacement electrode includes a first displacement electrode E31 on the negative X axis side and a second displacement electrode E32 on the positive X axis side arranged while interposing the Y axis when viewed from the Z axis direction and a third displacement electrode E33 arranged on the negative X axis side with respect to the first displacement electrode E31 and a fourth displacement electrode E34 arranged on the positive X axis side with respect to the second displacement electrode E32. The fixed electrode includes a first fixed electrode E21 arranged opposite to the first displacement electrode E31, a second fixed electrode E22 arranged opposite to the second displacement electrode E32, a third fixed electrode E23 arranged opposite to the third displacement electrode E33, and a fourth fixed electrode E24 arranged opposite to the fourth displacement electrode E34.

The first capacitive element C11 is formed by the first displacement electrode E31 and the first fixed electrode E21, the second capacitive element C12 is formed by the second displacement electrode E32 and the second fixed electrode E22, the third capacitive element C21 is formed by the third displacement electrode E33 and the third fixed electrode E23, and the fourth capacitive element C22 is formed by the fourth displacement electrode E34 and the fourth fixed electrode E24. In the present embodiment, the first displacement electrode E31 and the first fixed electrode E21 have the same shape, the second displacement electrode E32 and the second fixed electrode E22 have the same shape, the third displacement electrode E33 and the third fixed electrode E23 have the same shape, and the fourth displacement electrode E34 and the fourth fixed electrode E24 have the same shape.

Of course, in other embodiments, at least two, for example all, of the first to fourth displacement electrodes may be formed by a common electrode. Alternatively, the displacement electrode may include an encircling second displacement electrode while the fixed electrode E20 is formed by a common electrode. Further alternatively, the displacement electrode E30 may be formed by a common electrode while the fixed electrode E20 is formed by a first fixed electrode and a second fixed electrode encircling the first fixed electrode.

Alternatively, although not illustrated, an area of one of the fixed electrode and the displacement electrode may be set larger than an area of the other such that an effective facing area of the pair of electrodes forming the capacitive element does not change even when a relative position of the displacement electrode relative to the fixed electrode changes as a result of an action of a force in the X axis direction and the Z axis direction. As described earlier, this is a state where a projected image of the electrode having a smaller area (e.g. displacement electrode) is completely included within a surface of the other electrode having a larger area (e.g. fixed electrode) when a contour of the electrode having the smaller area is projected on the surface of the electrode having the larger area and thereby an orthogonal projection is formed. When this state is maintained, an effective area of the capacitive element formed by the electrodes is equivalent to an area of the smaller electrode and thus is always constant. That is, a detection accuracy of force can be enhanced.

To describe the structure of the electrodes in detail when viewed from the Z axis direction, the first fixed electrode E31 and the first displacement electrode E21 have a semicircular shape where a chord extending in parallel with the Y axis is a diameter thereof and an arc is formed on the negative X axis side with respect to the chord, the second fixed electrode E32 and the second displacement electrode E22 have a semicircular shape where a chord extending in parallel with the Y axis is a diameter thereof and an arc is formed on the positive X axis side with respect to the chord, the third fixed electrode E33 and the third displacement electrode E23 have a semi-annular shape surrounding the arcs of the first fixed electrode E31 and the first displacement electrode E21, respectively, and the fourth fixed electrode E34 and the fourth displacement electrode E24 have a semi-annular shape surrounding the arcs of the second fixed electrode E32 and the second displacement electrode E22, respectively. Each of the electrodes E20 and E30 of the present embodiment has a shape where each of the electrodes in the force sensor of the first embodiment is equally divided into two by the Y axis.

Figure 7:
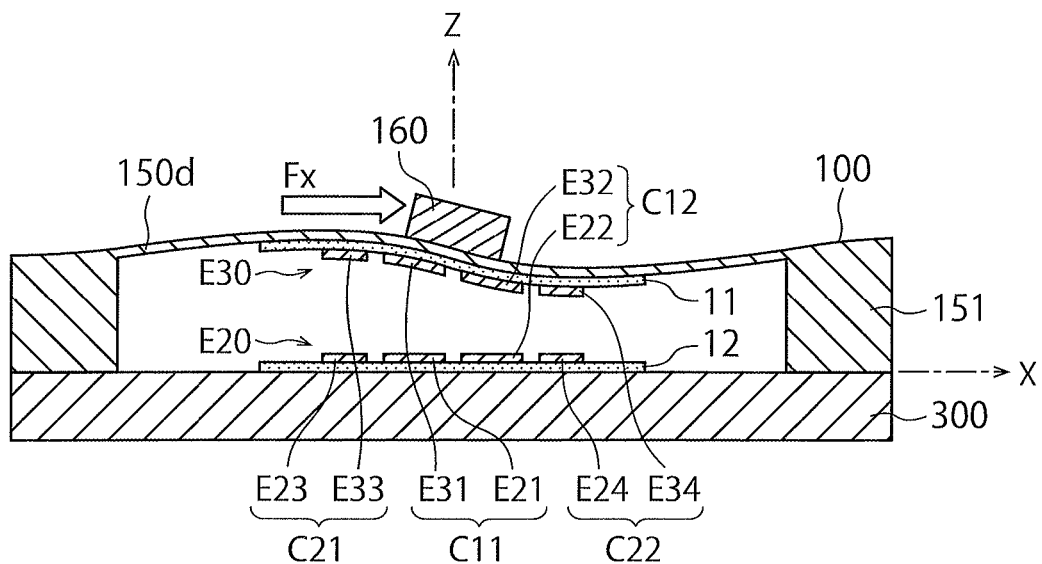
FIG. 7 is a schematic cross-sectional view illustrating a state where a diaphragm of the force sensor in FIG. 5 is deformed by force Fx in an X axis direction.

When downward force Fx in the X axis direction acts on the force receiving body 160 of the force sensor as described above, the diaphragm 150$d$ is elastically deformed. FIG. 7 is a schematic cross-sectional view illustrating a state where the diaphragm 150$d$ of the force sensor in FIG. 5 is deformed by force Fx in the X axis direction. In FIG. 7, force Fx is acting on the force receiving body 160 from a left side to a right side in the drawing. Here the diaphragm 150$d$ is deformed as illustrated in the drawing. Due to this deformation, the first displacement electrode E31 and the third displacement electrode E33 positioned on the negative X axis side are deformed upward while the second displacement electrode E32 and the fourth displacement electrode E34 are deformed downward as compared to an initial state where Fx is not acting on the force receiving body 160. Due to such deformation of displacement electrodes E31 to E34, capacitance values of the first capacitive element C11 and the third capacitive element C21 decrease while capacitance values of the second capacitive element C12 and the fourth capacitive element C22 increase. Based on such variation amounts of the capacitance values of the capacitive elements C11 to C22, force Fx in the X axis direction acting on the force receiving body 160 can be detected as "a difference between a sum of the capacitance value of the first capacitive element C11 and the capacitance value of the third capacitive element C21 and a sum of the capacitance value of the second capacitive element C12 and the capacitance value of the fourth capacitive element C22".

That is, when the first capacitive element C11 and the third capacitive element C21 are connected in parallel and the second capacitive element C12 and the fourth capacitive element C22 are connected in parallel, force Fx in the X axis direction applied to the force receiving body 160 can be measured based on the following mathematical formulas. In the following mathematical formulas, symbols C11 to C22 represent capacitance values of the first to fourth capacitive elements C11 to C22, respectively. Note that although the force and the capacitance value are connected by a sign "=", these are different physical quantities and thus actually the force Fx is measured after performing predetermined conversion. Symbol Fx1 represents force Fz that is measured based on the right side of the following mathematical formula and is for distinguishing itself from force Fz measured based on other mathematical formulas described later.

$$Fx1=(C12+C22)-(C11+C21) \qquad \text{[Mathematical Formulas 4]}$$

The force Fx in the X axis direction applied to the force receiving body 160 may be measured based on only the first capacitive element C11 and the second capacitive element C12 or based on only the third capacitive element C21 and the fourth capacitive element C22. That is, force F can be evaluated also by the following Fx2 or Fx3.

$$Fx2=C12-C11$$

$$Fx3=C22-C21 \qquad \text{[Mathematical Formulas 5]}$$

When force Fx acts on the force receiving body 160 from the right to the left in the drawing, variations of the capacitance values of the capacitive elements C11 to C22 become opposite. Specifically, the first displacement electrode E31 and the third displacement electrode E33 positioned on the negative X axis side are deformed downward while the second displacement electrode E32 and the fourth displacement electrode E34 are deformed upward. In this case, therefore, capacitance values of the first capacitive element C11 and the third capacitive element C21 increase while capacitance values of the second capacitive element C12 and the fourth capacitive element C22 decrease. Therefore evaluating signs of the right sides of the mathematical formulas of Fx1 to Fx3 allows for detecting orientation of the force Fx.

When downward force Fz is applied to the force receiving body 160 of the force sensor as force Fz in the Z axis direction, the diaphragm 150$d$ is curved downward. Along with this, the first to fourth displacement electrodes E31 to E34 are displaced downward. This results in a decrease in a clearance between the first to fourth displacement electrodes E31 to E34 and the first to fourth fixed electrodes E21 to E24, respectively. Each of capacitance values of the first to fourth capacitive elements C11 to C22 thus increases. Based on these variation amounts of capacitance values, force Fz in the Z axis direction acting on the force receiving body 160 can be detected as a sum of capacitance values of the first to fourth capacitive elements C11 to C22. Such principles of detecting force Fz is substantially the same as the case of the single-axis force sensor according to the first embodiment.

That is, when the first to fourth capacitive elements C11 to C22 are connected in parallel with each other, force Fz in the Z axis direction applied to the force receiving body 160 can be measured by the following mathematical formula of Fz1. Measurement can be performed by the following mathematical formula of Fz2 based on only the first capacitive element C11 and the second capacitive element C12 or by the following mathematical formula of Fz3 based on only the third capacitive element C21 and the fourth capacitive element C22.

$$Fz1=C11+C12+C21+C22$$

$$Fz2=C11+C12$$

$$Fz3=C21+C22 \qquad \text{[Mathematical Formulas 6]}$$

To determine whether the force sensor of the present embodiment is normally functioning, either one of Fx1 to Fx3 and Fz1 to Fz3 may be used. Here, the case of using Fx1 to Fx3 will be described. In this case, first, the first capacitive element C11 and the second capacitive element C12 are separated and then force Fx is separately measured based on the aforementioned mathematical formulas of Fz2 and Fz3. Thereafter whether a difference between Fx1 and Fx2 is within a predetermined range and whether a difference between Fx2 and Fx3 is within a predetermined range are evaluated. If all of the differences are within the predetermined ranges, the force sensor is determined as normally functioning. If at least one of the differences is outside the predetermined range, the force sensor is determined as not normally functioning (out of order).

Instead of evaluating whether a difference between Fx1 and Fx2 is within a predetermined range and whether a difference between Fx2 and Fx3 is within a predetermined range, whether a difference between Fx1 and Fx3 is within a predetermined range and whether a difference between Fx2 and Fx3 is within a predetermined range may be evaluated.

Note that Fx2 and Fx3 do not completely correspond to each other due to the structure of the displacement electrodes. This is because, for example when leftward force Fx acts on the force receiving body 160, upward displacement of the first displacement electrode E31 is larger than that of the third displacement electrode E33 and downward displacement of the second displacement electrode E32 is larger than that of the fourth displacement electrode E34 as understood from FIG. 7. Therefore, variation amounts of capacitance values of the first capacitive element C11 and the second capacitive element C12 are thus larger than variation amounts of capacitance values of the third capacitive element C21 and the fourth capacitive element C22. This also applies to a case where leftward force Fz acts on the force receiving body 160. In the force sensor of the present embodiment, setting the aforementioned predetermined range in consideration to a difference between the variation amounts of capacitance values of the capacitive elements allows for properly determining whether the force sensor is normally functioning.

When for example capacitance values of the first to fourth capacitive elements C11 to C22 are all equivalent in the initial state where force Fx or force Fz is not acting on the force receiving body 160, values of Fx2 and Fx3 are substantially a half a value of Fx1 and values of Fz2 and Fz3 are substantially a half a value of Fz1 as apparent from the right sides of the aforementioned [Mathematical Formulas 4] to [Mathematical Formulas 6]. Therefore, upon comparison between Fx1 and Fx2 or Fx1 and Fx3, processing for appropriate execution of the comparison is performed such as multiplying Fx2 or Fx3 by two. This also applies to Fz1 to Fz3. This processing is to be appropriately performed according to the capacitance values of the first to fourth capacitive elements C11 to C22.

Note that force acting on the force receiving body 160 can be measured by Fx2 or Fx3 or by Fz2 or Fz3 but is measured with a higher accuracy by Fx1 and Fz1. This is because capacitance values (areas of the electrodes) that are used for measurement of force are larger as compared to the case of Fx2, Fx3, Fz2, or Fz3 and thus variations of capacitance values are also large, resulting in advantage from the perspective of S/N.

The above determination method will be described based on an actual detection circuit included in the force sensor of the present embodiment.

Figures 8, 9:
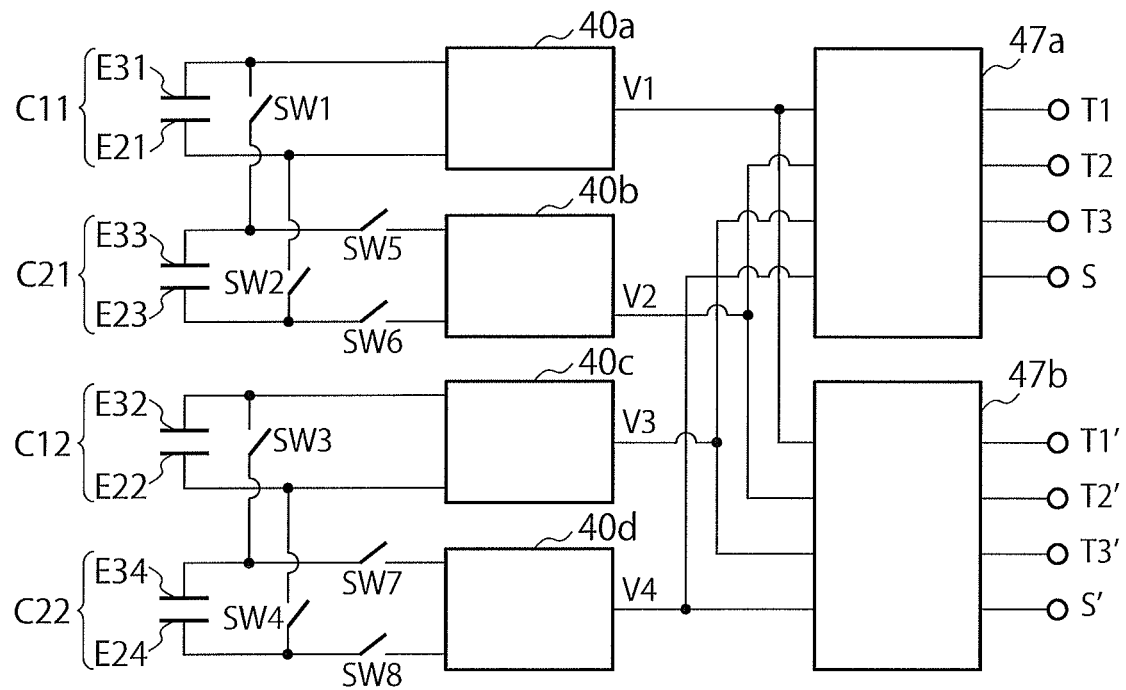
FIG. 8 is a circuit diagram illustrating an exemplary detection circuit used in the force sensor in FIG. 5.
FIG. 9 is a table illustrating ON/OFF connection states of switches included in the detection circuit in FIG. 8.

FIG. 8 is a circuit diagram illustrating an exemplary detection circuit that may be employed in the force sensor of the present embodiment. FIG. 9 is a table illustrating ON/OFF connection states of switches SW1 to SW8 included in the detection circuit in FIG. 8.

In order to detect force Fx and force Fz applied to the force receiving body 160 by the detection circuit in FIG. 8, it is only required to control connection states of the switches SW1 to SW8 as described in a column of timing 1 in FIG. 9. That is, the switches SW1 to SW4 are turned on (connected) while the remaining switches SW5 to SW8 are turned off (disconnected). As a result of this, an output signal corresponding to "C12+C22" and an output signal corresponding to "C11+C21" are provided to a first microcomputer 47a and a second microcomputer 47b via first to fourth C/V convertors and A/D convertors 45a to 45d. The first and the second microcomputers 47a and 47b calculate Fx1 and Fz1, that is, "(C12+C22)−(C11+C21)" and "(C12+C22)+(C11+C21)" based on the output signals and measures force Fx and force Fz. The measurement results are output from output terminals T1 and T1'.

Next, in order to determine whether the force sensor is normally functioning, it is only required to control connection states of the switches SW1 to SW8 as described in a column of timing 2 in FIG. 7. That is, the switches SW1 to SW4 are turned off (disconnected) while the remaining switches SW5 to SW8 are turned on (connected). As a result of this, output signals corresponding to "C11", "C12", "C21", and "C22" are provided to each of the first microcomputer 47a and the second microcomputer 47b. The first and the second microcomputers 47a and 47b calculate Fx2 and Fx3, that is, "C12−C11" and "C22 −C21" based on the output signals and measures force Fx. The measurement results are output from output terminals T2, T2', T3, and T3'.

The first and the second microcomputers 47a and 47b further evaluate, for example, (a) whether "Fx1−Fx2" is within a predetermined range and (b) whether "Fx2−Fx3" is within a predetermined range. When at least one of the conditions (a) and (b) is not satisfied, the force sensor is determined as not normally functioning (out of order). In this case, a failure determination signal representing determination of failure is output from output terminals S and S' in FIG. 8.

In the detection circuit illustrated in FIG. 8, the two microcomputers 47a and 47b are used. This is to allow one of the microcomputers to output force acting on the force receiving body 160 and a failure determination signal even when the other microcomputer fails. A user of the present sensor can further compare Fx1 to Fx3 and the failure determination signal output from the first microcomputer 47a and Fx1 to Fx3 and the failure determination signal output from the second microcomputer 47b, respectively, thus allowing for confirming reliability of the signals output from the detection circuit.

Upon determination of failure, the microcomputers 47a and 47b may evaluate (c) whether "Fx1−Fx3" is within a predetermined range and (b) whether "Fx2−Fx3" is within a predetermined range and determine that the force sensor is not normally functioning (out of order) when at least one of the conditions (c) and (b) is not satisfied. Alternatively, the microcomputers 47a and 47b may evaluate (a) whether "Fx1−Fx2" is within a predetermined range and (c) whether "Fx1−Fx3" is within a predetermined range and determine that the force sensor is not normally functioning (out of order) when at least one of the conditions (a) and (c) is not within the predetermined range.

As described above, performing failure diagnosis of the force sensor based on Fx1 to Fx3 does not require further measuring Fz2 and Fz3. Of course instead of failure diagnosis based on Fx1 to Fx3, failure diagnosis based on Fz1 to Fz3 may be performed. In this case, it is only required to measure Fz2 (=C11+C12) and Fz3 (=C21+C22) by the two microcomputers 47a and 47b in the connection states illustrated in the timing 2 in FIG. 9. For example, whether (a') "Fz1−Fz2" is within a predetermined range and (b') whether "Fz2−Fz3" is within a predetermined range may be evaluated and if at least one of the conditions (a') and (b') is not satisfied, the force sensor may be determined as not normally functioning (out of order).

Like in the case of failure diagnosis by Fx1 to Fx3, the microcomputers 47a and 47b may of course evaluate (c') whether "Fz1−Fz3" is within a predetermined range and (b') whether "Fz2−Fz3" is within a predetermined range and determine that the force sensor is not normally functioning (out of order) when at least one of the conditions (c') and (b') is not satisfied. Alternatively, the microcomputers 47a and 47b may evaluate (a') whether "Fz1−Fz2" is within a predetermined range and (c') whether "Fz1−Fz3" is within a predetermined range and determine that the force sensor is not normally functioning (out of order) when at least one of the conditions (a') and (c') is not within the predetermined range.

According to the force sensor of the present embodiment as described above, for example comparing force Fx1 to Fx3 that are measured based on an electrical signal corresponding to "(C12+C22)−(C11+C21)", an electrical signal corresponding to "C12 −C11", and an electrical signal corresponding to "C22−C21", respectively, allows the force sensor to determine by itself whether the force sensor is normally functioning. This allows for providing a force sensor capable of determining a failure (determination as to whether normally functioning) without using a plurality of force sensors, in other words, while minimizing cost and an installment space.

Specifically, the detection circuit determines whether a difference between Fz1 and Fz2 and a difference between Fz2 and Fz3 are within a predetermined range and thereby determines whether the force sensor is normally functioning. This allows for surely determining whether the force sensor is normally functioning.

In the present embodiment the capacitive elements C11 to C22 are symmetrically arranged with respect to the Y axis and thus it is easy to perform processing for measuring force Fx and force Fz to be detected based on a variation of capacitance value of the capacitive elements C11 to C22.

<<<§ 3. Example of Six-Axis Force Sensor>>>

Next, an example where the principles of failure diagnosis described in § 1 are applied to a six-axis force sensor will be described.

The six-axis force sensor described herein is capable of detecting six types of force including force Fx, Fy, and Fz in the X, Y, and Z axis directions and moment Mx, My, and Mz around the respective X, Y, and Z axes.

The term "force" means, as appropriate, either one of force in a specific direction of a coordinate axis and collective force including a moment component. For example, force Fx, Fy, and Fz refer to force components in the respective directions of the coordinate axes that are not moment. On the contrary, six types of force Fx, Fy, Fz, Mx, My, and Mz refer to collective force including the force components in the respective directions of the coordinate axes and moment components around the respective axes.

Figure 10:
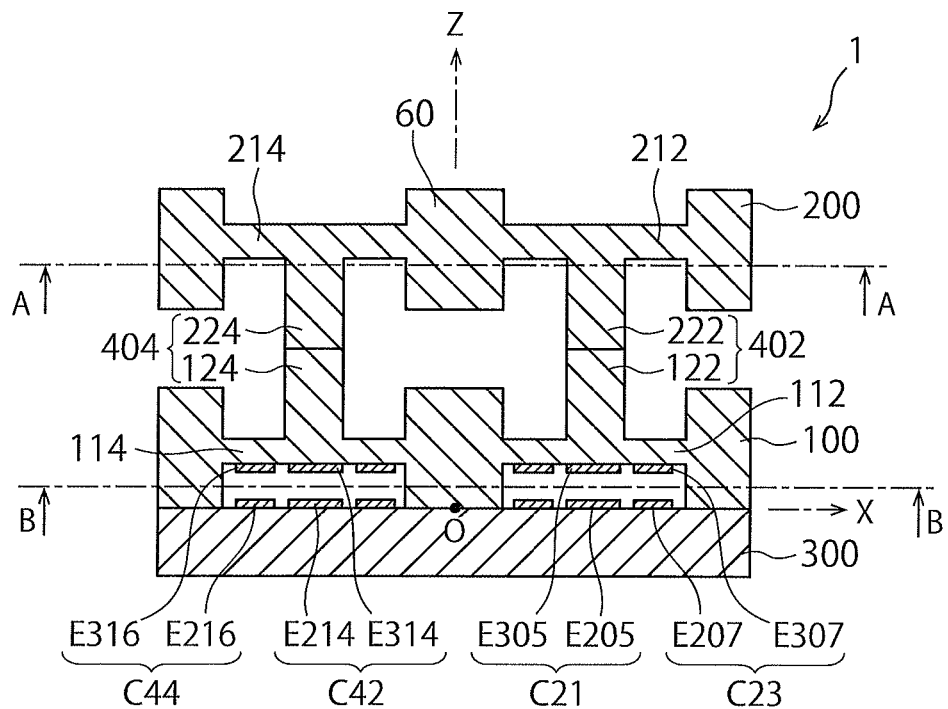
FIG. 10 is a schematic cross-sectional view of a six-axis force sensor of a third embodiment of the present invention.
Figure 11:
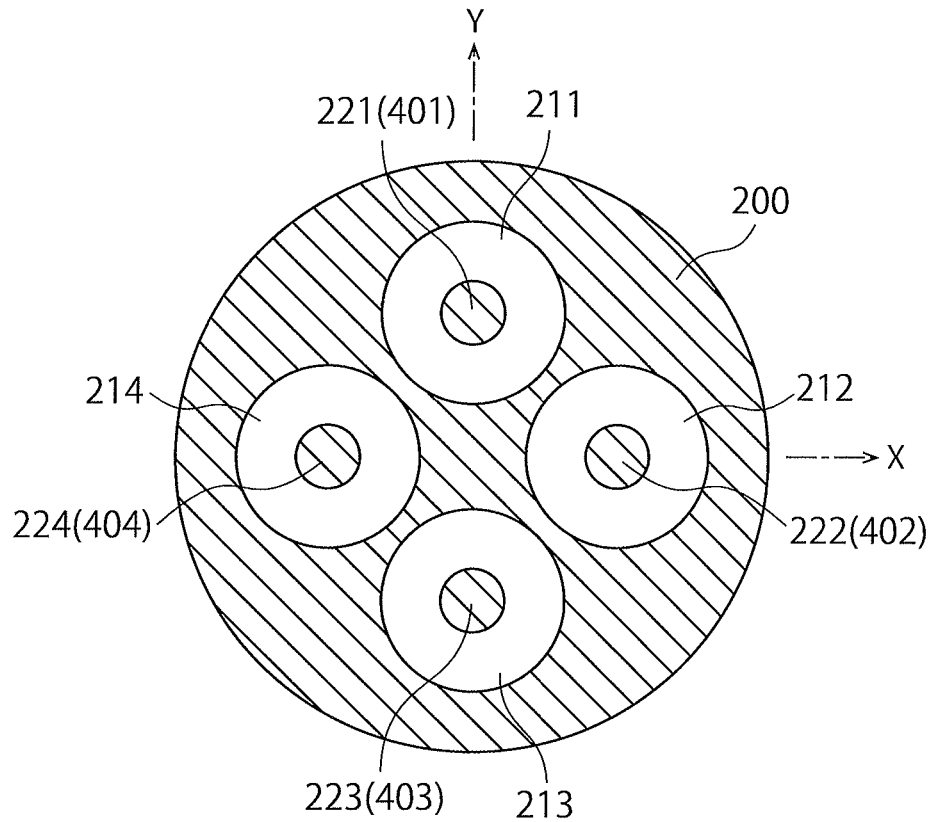
FIG. 11 is a cross-sectional view taken along line A-A in FIG. 10.
Figure 12:
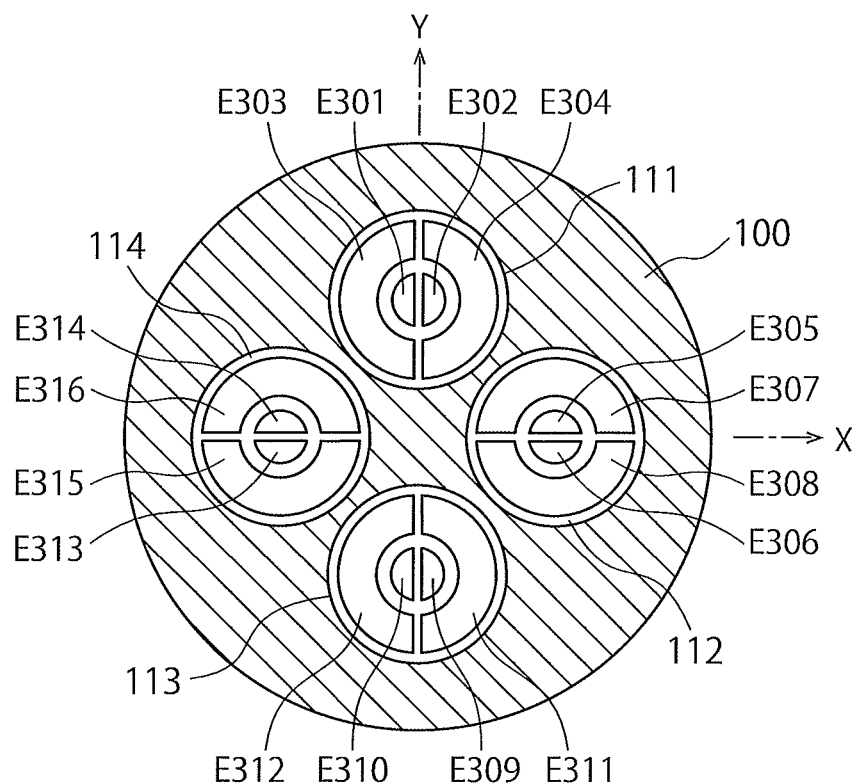
FIG. 12 is a cross-sectional view taken along line B-B in FIG. 10.

FIG. 10 is a schematic cross-sectional view of a six-axis force sensor according to a third embodiment of the present invention. FIG. 11 is a cross-sectional view taken along line A-A in FIG. 10. FIG. 12 is a cross-sectional view taken along line B-B in FIG. 10.

As illustrated in FIGS. 10 to 12, a force sensor of the present invention includes: a supporting body 300 arranged on an X-Y plane; a first deformation body 100 arranged opposite to the supporting body 300 and having four first deformation parts 111 to 114 elastically deformed by an action of a force or a moment to be detected; a fixed electrode arranged on the supporting body 300 corresponding to each of the deformation parts 111 to 114 of the first deformation body 100; a displacement electrode provided to each of the four first deformation parts 111 to 114 of the first deformation body 100 in such a manner as to face the fixed electrode, the displacement electrodes forming four pairs of capacitive elements together with the fixed electrodes; and a second deformation body 200 arranged opposite to an upper side of the first deformation body 100. The second deformation body 200 of the present embodiment has four second deformation parts 211 to 214 arranged opposite to the four first deformation parts 111 to 114. The force sensor of the present embodiment further includes four connecting members 401 to 404 that connect the first deformation parts 111 to 114 to the second deformation parts 211 to 214 corresponding to the first deformation parts 111 to 114. Note that in FIG. 10, illustration of the first deformation parts 111 and 113, the second deformation parts 211 and 213, and the connecting members 401 and 403 are omitted in order to avoid complexity.

The first deformation body 100 may be formed by a plate material of a disk shape made of metal for example where four thin regions having elasticity (flexibility) are formed by every 90 degrees at an equivalent distance from the center of the disk. These four regions with elasticity function as the first deformation parts 111 to 114. The second deformation body 200 of the present embodiment may be formed by a plate material of a disk shape made of metal and having the same diameter as that of the first deformation body 100 for example where four thin regions having elasticity are formed by every 90 degrees at an equivalent distance from the center of the disk. These four regions with elasticity function as the second deformation parts 211 to 214.

The supporting body 300 of the present embodiment has a disk shape with the same diameter as that of the first deformation body 100 and the second deformation body 200 and supports the first deformation body 100 at a lower surface thereof excluding the first deformation parts 111 to 114 as illustrated in FIG. 10. The first deformation parts 111 to 114 and the second deformation parts 211 to 214 are arranged at an equivalent distance from the origin O with each of the units arranged on a positive X axis, a positive Y axis, a negative X axis, and a negative Y axis when viewed from a Z axis direction (see FIG. 11). In the present embodiment, each of the first deformation parts 111 to 114 and the second deformation parts 211 to 214 is configured as a round diaphragm having the same diameter when viewed from the Z axis direction.

Upper surfaces (surfaces in an upper side in FIG. 10) of the first deformation parts 111 to 114 are provided with first connecting units 121 to 124, respectively, extending upward along the Z axis direction from the central positions of round shapes of the first deformation parts 111 to 114. Lower surfaces (surfaces in a lower side in FIG. 10) of the second deformation parts 211 to 214 are provided with second connecting units 221 to 224, respectively, extending downward along the Z axis direction from the central positions of round shapes of the second deformation parts 211 to 214. Firmly connecting the first connecting units 121 to 124 to the second connecting units 221 to 224 corresponding thereto, respectively, by an appropriate connecting means such as a bolt forms the four connecting members 401 to 404 extending in the Z axis direction.

Such a configuration results in that the second deformation body 200 is in an original position with respect to the supporting body 300 when no force is acting on the second deformation body 200 and that the four first deformation parts 111 to 114 having elasticity (flexibility) are elastically deformed and a relative position of the second deformation body 200 to the supporting body 300 changes when some force acts on the second deformation body 200. Of course, when on force is acting on the second deformation body 200, the second deformation body 200 returns to the original position.

As illustrated in FIG. 10, the four pairs of capacitive elements are formed by the displacement electrodes arranged on lower surfaces of the four first deformation parts 111 to 114 and fixed electrodes arranged opposite to the displacement electrodes. A first pair of capacitive elements out of the four pairs of capacitive elements will be described first. The first pair of capacitive elements is provided to a region corresponding to the first deformation part 111 on a positive Y axis side when viewed from the Z axis direction and formed by four capacitive elements.

As the electrodes forming the four capacitive elements C11 to C14, a first displacement electrode E301 on a negative X axis side and a second displacement electrode E302 on a positive X axis side arranged while interposing the Y axis and a third displacement electrode E303 arranged on the negative X axis side with respect to the first displacement electrode E301, and a fourth displacement electrode E304 arranged on the positive X axis side with respect to the second displacement electrode E302 are provided on the lower surface of the first deformation part 111 on the positive Y axis side. The supporting body 300 is provided with a first fixed electrode E201 arranged opposite to the first displacement electrode E301, a second fixed electrode E202 arranged opposite to the second displacement electrode E302, a third fixed electrode E203 arranged opposite to the third displacement electrode E303, and a fourth fixed electrode E204 arranged opposite to the fourth displacement electrode E304 thereon.

In the present embodiment, when viewed from the Z axis direction, the first fixed electrode E201 and the first displacement electrode E301 have a semicircular shape where a chord extending in parallel with the Y axis is a diameter thereof and an arc is formed on the negative X axis side with respect to the chord, the second fixed electrode E202 and the second displacement electrode E302 have a semicircular shape where a chord extending in parallel with the Y axis is a diameter thereof and an arc is formed on the positive X axis side with respect to the chord, the third fixed electrode E203 and the third displacement electrode E303 have a semi-annular shape surrounding the arcs of the first fixed electrode E201 and the first displacement electrode E301, respectively, and the fourth fixed electrode E204 and the fourth displacement electrode E304 have a semi-annular shape surrounding the arcs of the second fixed electrode E202 and the second displacement electrode E302, respectively. Note that a substrate supporting each of the electrodes is not illustrated in FIGS. 10 and 13 to 15.

With such arrangement of the electrodes, the first capacitive element C11 is formed by the first displacement electrode E301 and the first fixed electrode E201, the second capacitive element C12 is formed by the second displacement electrode E302 and the second fixed electrode E202, the third capacitive element C13 is formed by the third displacement electrode E303 and the third fixed electrode E203, and the fourth capacitive element C14 is formed by the fourth displacement electrode E304 and the fourth fixed electrode E204.

The force sensor of the present embodiment further includes three pairs of capacitive elements, which are second to fourth pairs of capacitive elements. The second pair of capacitive elements is also formed by four capacitive elements (fifth to eighth capacitive elements C21 to C24). The second pair of capacitive elements has a configuration where the aforementioned first pair of capacitive elements, that is the first to fourth capacitive elements C11 to C14, are rotated clockwise by 90 degrees about the origin. That is, the fifth capacitive element C21 is arranged at a position where the first capacitive element C11 is rotated clockwise by 90 degrees about the origin, the sixth capacitive element C22 is arranged at a position where the second capacitive element C12 is rotated clockwise by 90 degrees about the origin, the seventh capacitive element C23 is arranged at a position where the third capacitive element C13 is rotated clockwise by 90 degrees about the origin, and the eighth capacitive element C24 is arranged at a position where the fourth capacitive element C14 is rotated clockwise by 90 degrees about the origin. Of course fifth to eighth fixed electrodes E205 to E208 and fifth to eighth displacement electrodes E305 to E308 forming the fifth to eighth capacitive elements C21 to C24 are arranged in a similar manner at positions where the first to fourth fixed electrodes E201 to E204 and the first to fourth displacement electrodes E301 to E304 are rotated clockwise by 90 degrees about the origin.

In a similar manner, the third pair of capacitive elements is also formed by four capacitive elements (ninth to twelfth capacitive elements C31 to C34), which are arranged at positions where the aforementioned fifth to eighth capacitive elements C21 to C24 are rotated clockwise by 90 degrees about the origin. The fourth pair of capacitive elements is also formed by four capacitive elements (thirteenth to sixteenth capacitive elements C41 to C44), which are arranged at positions where the aforementioned ninth to twelfth capacitive elements C31 to C34 are rotated clockwise by 90 degrees about the origin.

The first and the third capacitive elements C11 and C13 and the second and the fourth capacitive elements C12 and C14 are arranged symmetrically with respect to the positive Y axis and form the first pair of capacitive elements having substantially a round shape as a whole. The fifth and the seventh capacitive elements C21 and C23 and the sixth and the eighth capacitive elements C22 and C24 are arranged symmetrically with respect to the positive X axis and form the second pair of capacitive elements having substantially a round shape as a whole. The ninth and the eleventh capacitive elements C31 and C33 and the tenth and the twelfth capacitive elements C32 and C34 are arranged symmetrically with respect to the negative Y axis and form the third pair of capacitive elements having substantially a round shape as a whole. The thirteenth and the fifteenth capacitive elements C41 and C43 and the fourteenth and the sixteenth capacitive elements C42 and C44 are arranged symmetrically with respect to the negative X axis and form the fourth pair of capacitive elements having substantially a round shape as a whole. The first to fourth pairs of capacitive elements are arranged at an equivalent distance from the origin O and arranged concentric to the corresponding first deformation parts 111 to 114, respectively.

As described above, the first deformation parts 111 to 114 of the first deformation body 100 are connected to the second deformation parts 211 to 214 of the second deformation body 200 via connecting members 401 to 404, respectively (see FIGS. 10 and 11). When force acts on the second deformation body 200, therefore, the force is transferred to the first deformation parts 111 to 114 of the first deformation body 100 via the second deformation body 200 and the connecting members 401 to 404 and the first deformation parts 111 to 114 are deformed according to the magnitude and a direction of the force. Along with this deformation, the first to sixteenth displacement electrodes E301 to E316 arranged in the first deformation parts 111 to 114 are displaced in the Z axis direction. That is, each of relative positions (clearances) of the first to sixteenth displacement electrodes E301 to E316 to the first to sixteenth fixed electrodes E201 to E216 arranged on the supporting body 300 changes. That is, each of capacitance values of the capacitive elements C11 to C44 varies and thus detecting these variation amounts allows for measuring a direction and the magnitude of a force acting on the second deformation body 200.

Next, principles of measuring force Fx, Fy, and Fz in the X, Y, and Z axis directions and moment Mx, My, and Mz around the respective axes will be described. In the following descriptions, it is assumed that force or moment acts on the second deformation body 200 while the supporting body 300 is fixed.

Figure 13:
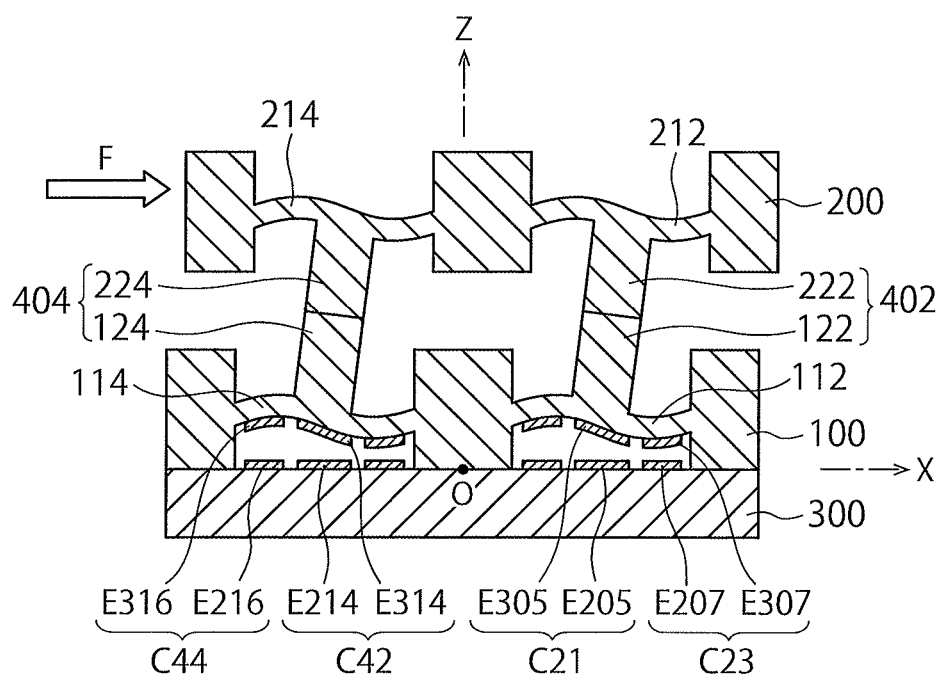
FIG. 13 is a schematic cross-sectional view illustrating a state of the force sensor in FIG. 10 when force in an X axis direction is acting thereon.

FIG. 13 is a schematic cross-sectional view illustrating a state of the force sensor in FIG. 10 when force Fx in the X axis direction is acting on the second deformation body 200. In FIG. 13, an exemplary case where force Fx acts rightward is illustrated. In this case, the first deformation parts 111 to 114 of the first deformation body and the second deformation parts 211 to 214 of the second deformation body are deformed as illustrated in the drawing. That is, in each of the first deformation parts 111 to 114, the semicircular region in the positive X axis side is deformed downward while the semicircular region on the negative X axis side is deformed upward. Therefore, capacitance values of the first, the third, the tenth, and the twelfth capacitive elements C11, C13, C32, and C34 arranged on the negative X axis side in the first and the third pairs of capacitive elements decrease while capacitance values of the second, the fourth, the ninth, and the eleventh capacitive elements C12, C14, C31, and C33 arranged on the positive X axis side in the first and the third pairs of capacitive elements increase. Contrary to this, the remaining fifth to eighth capacitive elements C21 to C24 and the thirteenth to sixteenth capacitive elements C41 to C44 have substantially no change in the capacitance value since there are regions where a clearance between the displacement electrode and the fixed electrode increases and decreases and thus variations in the capacitance value cancel out each other.

When leftward force in the X axis direction acts on the second deformation body 200, of course, opposite variations in capacitance values to the variations described above in the first and the third pairs of capacitive elements occur. That is, capacitance values of the first, the third, the tenth, and the twelfth capacitive elements C11, C13, C32, and C34 arranged on the negative X axis side in the first and the third pairs of capacitive elements increase while capacitance values of the second, the fourth, the ninth, and the eleventh capacitive elements C12, C14, C31, and C33 arranged on the positive X axis side in the first and the third pairs of capacitive elements decrease. Capacitance values of the remaining fifth to eighth capacitive elements C21 to C24 and the thirteenth to sixteenth capacitive elements C41 to C44 substantially do not change like in the aforementioned case.

A case where force Fy in the Y axis direction acts on the second deformation body 200 is understood by shifting, by 90 degrees, a state where force Fx in the X axis direction acts on the second deformation body 200 and descriptions thereon are thus omitted.

Figure 14:
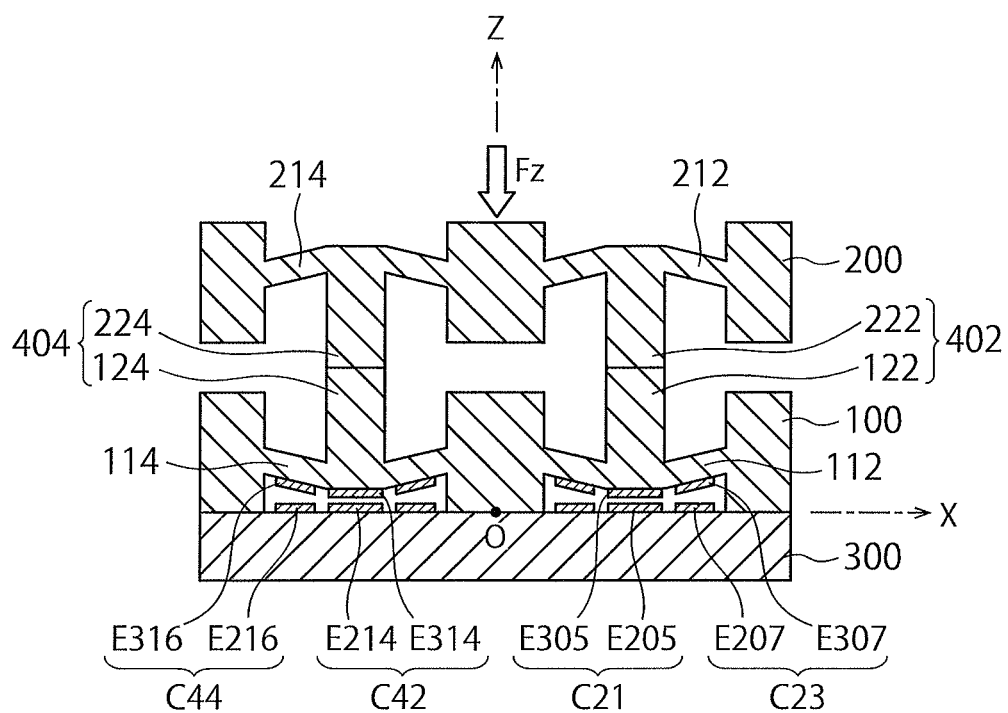
FIG. 14 is a schematic cross-sectional view illustrating a state of the force sensor in FIG. 10 when force in a Z axis direction is acting thereon.

Next, a case where force Fz in the Z axis direction acts on the second deformation body 200 will be examined. FIG. 14 is a schematic cross-sectional view illustrating a state of the force sensor in FIG. 10 when force Fz in the Z axis direction is acting on the second deformation body 200. In FIG. 14, an exemplary case where force Fz acts downward is illustrated. In this case, the first deformation parts 111 to 114 of the first deformation body and the second deformation parts 211 to 214 of the second deformation body are deformed as illustrated in the drawing. That is, each of the first deformation parts 111 to 114 is deformed downward. All of the first to sixteenth capacitive elements C11 to C44 have a smaller clearance between the displacement electrode and the fixed electrode and thus a capacitance value increases.

When force in the Z axis direction acts upward on the second deformation body 200, contrarily to the case described above, each of the first deformation parts 111 to 114 is deformed upward. All of the first to sixteenth capacitive elements C11 to C44 therefore have a larger clearance between the displacement electrode and the fixed electrode and thus a capacitance value decreases.

Figure 15:
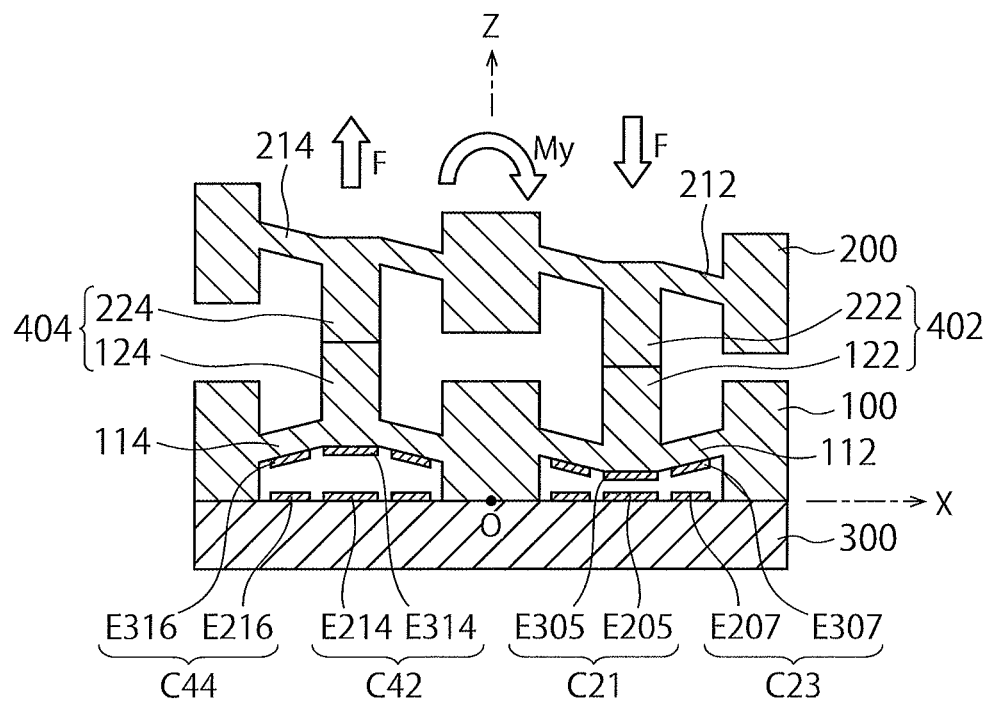
FIG. 15 is a schematic cross-sectional view illustrating a state of the force sensor in FIG. 10 when a moment around a Y axis is acting thereon.

Next, a case where moment My around the Y axis acts on the second deformation body 200 will be examined. FIG. 15 is a schematic cross-sectional view illustrating a state of the force sensor in FIG. 10 when moment My around the Y axis is acting on the second deformation body 200. In FIG. 15, an exemplary case where moment My acts clockwise is illustrated. In this case, the first deformation parts 111 to 114 of the first deformation body and the second deformation parts 211 to 214 of the second deformation body are deformed as illustrated in the drawing. That is, the first deformation part 112 on the positive X axis side is deformed downward while the first deformation part 114 on the negative X axis side is deformed upward. Meanwhile, although not illustrated, in the first deformation parts 111 and 113 on the positive Y axis side and the negative Y axis side, the semicircular regions on the positive X axis side are deformed downward while the semicircular regions on the negative X axis side are deformed upward.

Therefore, capacitance values of the fifth to eighth capacitive elements C21 to C24 corresponding to the first deformation part 112 on the positive X axis side increase while capacitance values of the thirteenth to sixteenth capacitive elements C41 to C44 corresponding to the first deformation part 114 on the negative X axis side decrease. On the contrary, capacitance values of the first to fourth capacitive elements C11 to C14 and the ninth to twelfth capacitive elements C31 to C34 corresponding to the first deformation parts 111 and 113 on the positive Y axis side and the negative Y axis side substantially do not change as described in the case where force Fx in the X axis direction acts on the second deformation body 200 (see FIG. 13).

When counterclockwise moment around the Y axis acts on the second deformation body 200, contrarily to the aforementioned case, capacitance values of the fifth to eighth capacitive elements C21 to C24 corresponding to the first deformation part 112 on the positive X axis side decrease while capacitance values of the thirteenth to sixteenth capacitive elements C41 to C44 corresponding to the first deformation part 114 on the negative X axis side increase. Also in this case, capacitance values of the first to fourth capacitive elements C11 to C14 and the ninth to twelfth capacitive elements C31 to C34 corresponding to the first deformation parts 111 and 113 on the positive Y axis side and the negative Y axis side substantially do not change.

A case where moment Mx around the X axis acts on the second deformation body 200 is understood by shifting, by 90 degrees, a state where moment My around the Y axis acts on the second deformation body 200 and descriptions thereon are thus omitted.

When moment Mz around the Z axis acts on the second deformation body 200, each of the connecting members 401 to 404 is displaced inclined toward the same rotation direction along a periphery about the Z axis. When for example clockwise moment Mz around the Z axis acts on the second deformation body 200 when viewed from the positive Z axis, therefore, the semicircular region on the positive X axis side is deformed downward while the semicircular region on the negative X axis side is deformed upward in the first deformation part 111 on the positive Y axis side. In the first deformation part 112 on the positive X axis side, the semicircular region on the negative Y axis side is deformed downward while the semicircular region on the positive Y axis side is deformed upward. In the first deformation part 113 on the negative Y axis side, the semicircular region on the negative X axis side is deformed downward while the semicircular region on the positive X axis side is deformed upward. In the first deformation part 114 on the negative X axis side, the semicircular region on the positive Y axis side is deformed downward while the semicircular region on the negative Y axis side is deformed upward.

In the first pair of capacitive elements corresponding to the first deformation part 111 on the positive Y axis side, therefore, capacitance values of the first and the third capacitive elements C11 and C13 decrease while capacitance values of the second and the fourth capacitive elements C12 and C22 increase. Similarly in the second pair of capacitive elements corresponding to the second deformation part 112 on the positive X axis side, capacitance values of the fifth and the seventh capacitive elements C21 and C23 decrease while capacitance values of the sixth and the eighth capacitive elements C22 and C24 increase. In the third pair of capacitive elements corresponding to the first deformation part 113 on the negative Y axis side, capacitance values of the ninth and the eleventh capacitive elements C31 and C33 decrease while capacitance values of the tenth and the twelfth capacitive elements C32 and C34 increase. In the fourth pair of capacitive elements corresponding to the first deformation part 114 on the negative X axis side, capacitance values of the thirteenth and the fifteenth capacitive elements C41 and C43 decrease while capacitance values of the fourteenth and the sixteenth capacitive elements C42 and C44 increase.

On the contrary, when a moment around the Z axis acting on the second deformation body 200 acts in a direction opposite to the aforementioned direction, the first deformation parts 111 to 114 are deformed in the opposite manner. As a result of this, variations of the capacitance values of the first to sixteenth capacitive elements C11 to C44 become the opposite.

FIG. 16 is a table of a list of variations in capacitance values occurring in capacitive elements C11 to C44 when the aforementioned force Fx, Fy, Fz, Mx, My, and Mz act. A sign "+" in the table represents an increase in the capacitance value and a sign "−" represents a decrease in the capacitance value. A value "0" represents that the capacitance value has substantially no change. As described above, when force Fx, Fy, Fz, Mx, My, and Mz are in an opposite direction, the sign in the table becomes the opposite.

From the variations of capacitance values of the capacitive elements C11 to C44, the six components of force Fx, Fy, Fz, Mx, My, and Mz are represented by the following formulas.

$$Fx=(C12+C14+C31+C33)-(C11+C13+C32+C34)$$

$$Fy=(C21+C23+C42+C44)-(C22+C24+C41+C43)$$

$$Fz=-(C11+C12+C13+C14+C21+C22+C23+C24+C31+C32+C33+C34+C41+C42+C43+C44)$$

$$Mx=(C31+C32+C33+C34)-(C11+C12+C13+C14)$$

$$My=(C21+C22+C23+C24)-(C41+C42+C43+C44)$$

$$Mz=(C11+C13)-(C12+C14)+(C21+C23)-(C22+C24)+(C31+C33)-(C32+C34)+(C41+C43)-(C42+C44)$$ [Mathematical Formulas 7]

In the [Mathematical Formulas 7], the six components of force Fx, Fy, Fz, Mx, My, and Mz are represented by using all of the capacitive elements C11 to C14, the six components of force Fx, Fy, Fz, Mx, My, and Mz may also be represented as In the following [Mathematical Formulas 8] by using only the capacitive elements arranged on outer sides of the four pairs of capacitive elements, that is, the third, the fourth, the seventh, the eighth, the eleventh, the twelfth, the fifteenth, and the sixteenth capacitive elements C13, C14, C23, C24, C33, C34, C43, and C44. Note that an apostrophe (') is added in order to distinguish a component calculated based on [Mathematical Formulas 8] from a component calculated based on [Mathematical Formulas 7].

$$Fx'=(C14+C33)-(C13+C34)$$

$$Fy'=(C23+C44)-(C24+C43)$$

$$Fz'=-(C13+C14+C23+C24+C33+C34+C43+C44)$$

$$Mx'=(C33+C34)-(C13+C14)$$

$$My'=(C23+C24)-(C43+C44)$$

$$Mz'=C13-C14+C23-C24+C33-C34+C43-C44$$ [Mathematical Formulas 8]

Upon determining whether the force sensor of the present embodiment is normally functioning, for example, comparing the components Fx, Fy, Fz, Mx, My, and Mz calculated based on [Mathematical Formulas 7] and components Fx', Fy', Fz', Mx', My', and Mz' calculated based on [Mathematical Formulas 8] is effective. That is, it is only required to evaluate whether each of (a) a difference between Fx and Fx', (b) a difference between Fy and Fy', (c) a difference between Fz and Fz', (d) a difference between Mx and Mx', (e) a difference between My and My' and (f) a difference between Mz and Mz' is within a predetermined range. If all of the differences (a) to (f) are within the predetermined ranges, the force sensor is determined as normally functioning. If at least one of the differences (a) to (f) is outside the predetermined range, the force sensor is determined as not normally functioning (out of order).

The above determination method will be described based on an actual detection circuit included in the force sensor of the present embodiment.

Figure 17:
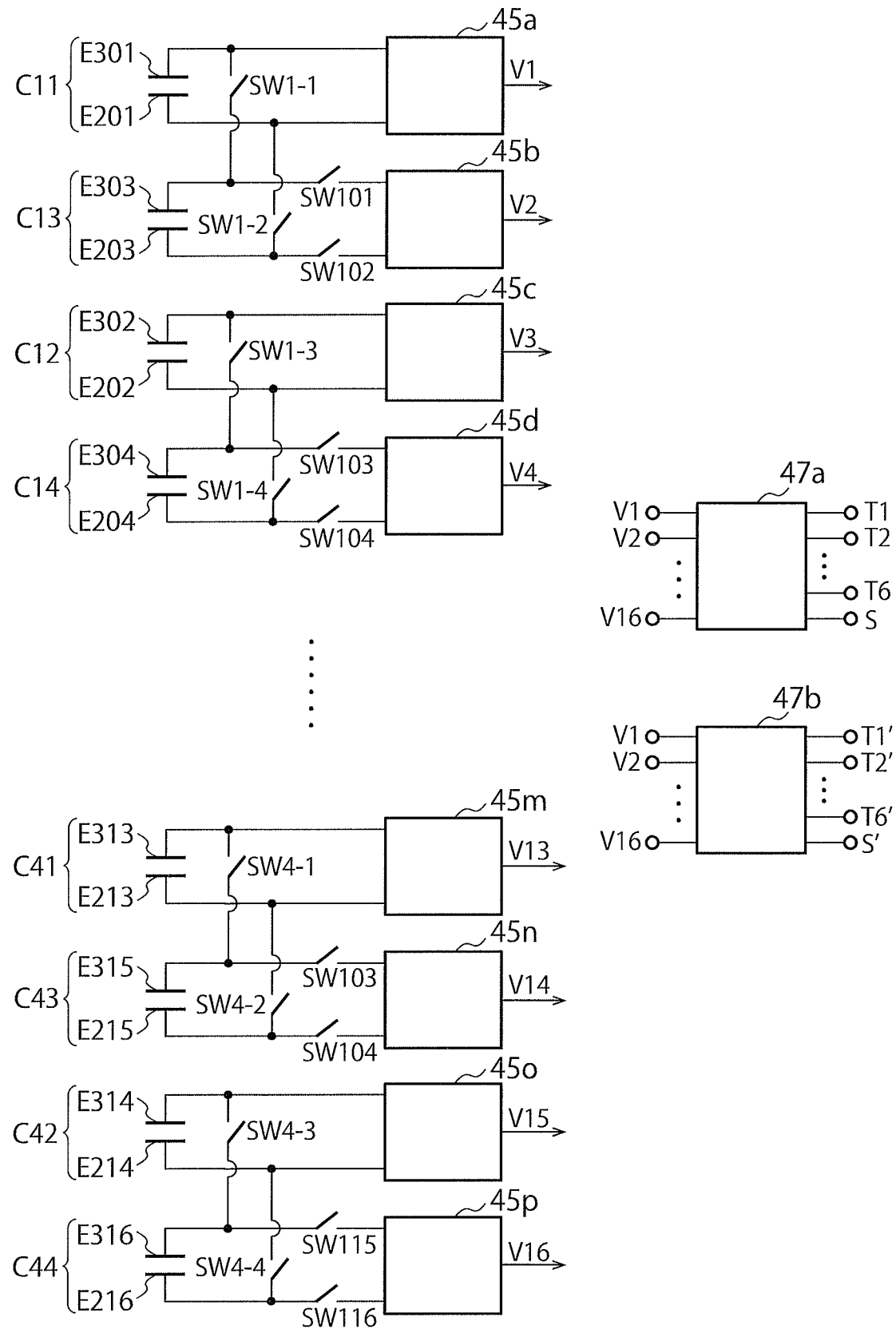
FIG. 17 is a circuit diagram illustrating an exemplary detection circuit used in the force sensor in FIG. 10.

FIG. 17 is a circuit diagram illustrating an exemplary detection circuit used in the force sensor in FIG. 10. FIG. 18 is a table illustrating ON/OFF connection states of switches included in the detection circuit in FIG. 17.

In order to detect force acting on the second deformation body 200 by the detection circuit in FIG. 17, it is only required to control connection states of switches SW11 to SW44 and SW101 to SW116 as described in a column of timing 1 in FIG. 18. That is, the switches SW11 to SW44 are turned on (connected) while the remaining switches SW101 to SW116 are turned off (disconnected). As a result of this, an output signal V1 corresponding to "C11+C13", an output signal V3 corresponding to "C12+C14", an output signal V5 corresponding to "C21+C23", an output signal V7 corresponding to "C22+C24", an output signal V9 corresponding to "C31+C33", an output signal V11 corresponding to "C32+C34", an output signal V13 corresponding to "C41+C43", and an output signal V15 corresponding to "C42+C44" are provided to a first microcomputer 47a and a second microcomputer 47b via first to sixteenth C/V convertors and A/D convertors 45a to 45p. The first and the second microcomputers 47a and 47b calculate the six components of force Fx, Fy, Fz, Mx, My, and Mz described in [Mathematical Formulas 7] based on the respective output signals. The first and the second microcomputers 47a and 47b are provided with six output terminals T1 to T6 and another six output terminals T1' to T6', respectively. The component Fx is output from the output terminals T1 and T1', the component Fy is output from the output terminals T2 and T2', the component Fz is output from the output terminals T3 and T3', the component Mx is output from the output terminals T4 and T4', the component My is output from the output terminals T5 and T5', and the component Mz is output from the output terminals T6 and T6'. Note that V2, V4, V6, V8, V10, V12, V14, and V16 in FIG. 17 equal zero since the switches SW101 to SW116 are turned off.

Next, in order to determine whether the force sensor is normally functioning, it is only required to control connection states of the switches SW11 to SW44 and SW101 to SW116 as described in a column of timing 2 in FIG. 18. That is, the switches SW11 to SW44 are turned off (disconnected) while the remaining switches SW101 to SW116 are turned on (connected). As a result of this, an output signal V1 corresponding to "C11", an output signal V2 corresponding to "C13", an output signal V3 corresponding to "C12", an output signal V4 corresponding to "C14", an output signal V5 corresponding to "C21", an output signal V6 corresponding to "C23", an output signal V7 corresponding to "C22", an output signal V8 corresponding to "C24", an output signal V9 corresponding to "C31", an output signal V10 corresponding to "C33", an output signal V11 corresponding to "C32", an output signal V12 corresponding to "C34", an output signal V13 corresponding to "C41", an output signal V14 corresponding to "C43", an output signal V15 corresponding to "C42", and an output signal V16 corresponding to "C44" are provided to each of the first microcomputer 47a and the second microcomputer 47b. The first and the second microcomputers 47a and 47b calculates the six components of force Fx', Fy', Fz', Mx, My', and Mz' described in [Mathematical Formulas 8] based on the respective output signals. Then the component Fx' is output from the output terminals T1 and T1', the component Fy' is output from the output terminals T2 and T2', the component Fz' is output from the output terminals T3 and T3', the component Mx' is output from the output terminals T4 and T4', the component My' is output from the output terminals T5 and T5', and the component Mz' is output from the output terminals T6 and T6'.

The first and the second microcomputers 47a and 47b further evaluate (a) whether "Fx−Fx'" is within a predetermined range, (b) whether "Fy−Fy'" is within a predetermined range, (c) whether "Fz−Fz'" is within a predetermined range, (d) whether "Mx−Mx'" is within a predetermined range, (e) whether "My−My'" is within a predetermined range, and (f) whether "Mz−Mz'" is within a predetermined range. When at least one of the conditions (a) to (f) is not satisfied, the force sensor is determined as not normally functioning (out of order). In this case, a failure determination signal representing determination of failure is output from output terminals S and S' in FIG. 17.

In the detection circuit illustrated in FIG. 17, the two microcomputers 47a and 47b are used. This is to allow one of the microcomputers to output the six components Fx, Fy, Fz, Mx, My, and Mz of force acting on the second deformation body 200 and a failure determination signal even when the other microcomputer fails. A user of the present sensor can further compare Fx to Mz, Fx' to Mz', and the failure determination signal output from the first microcomputer 47a and Fx to Mz, Fx' to Mz', and the failure determination signal output from the second microcomputer 47b, respectively, thus allowing for confirming reliability of the signals output from the detection circuit.

In the above determination method of failure only the capacitive elements arranged on outer sides of each of the four pairs of capacitive elements are used to perform failure determination of the force sensor; however, only the capacitive elements arranged on inner sides of each of the four pairs of capacitive elements may be used to perform failure determination of the force sensor. In this case, the following [Mathematical Formulas 9] are used instead of the aforementioned [Mathematical Formulas 8].

$Fx''=(C12+C31)-(C11+C32)$ $Fy''=(C21+C42)-(C22+C41)$ $Fz''=-(C11+C12+C21+C22+C31+C32+C41+C42)$ $Mx''=(C31+C32)-(C11+C12)$ $My''=(C21+C22)-(C41+C42)$ $Mz''=C11-C12+C21-C22+C31-C32+C41-C42$ [Mathematical Formulas 9]

In this case, the first and the second microcomputers 47a and 47b evaluate (a') whether "Fx−Fx''" is within a predetermined range, (b') whether "Fy−Fy''" is within a predetermined range, (c') whether "Fz−Fz''" is within a predetermined range, (d') whether "Mx−Mx''" is within a predetermined range, (e') whether "My−My''" is within a predetermined range, and (f') whether "Mz−Mz''" is within a predetermined range. When at least one of the conditions (a') to (f') is not satisfied, the force sensor is determined as not normally functioning (out of order) and a failure determination signal representing determination of failure is output from output terminals S and S' in FIG. 17.

Note that the six components of force acting on the second deformation body 200 may be measured by Fx' to Mz' or Fx" to Mz" but is measured with a higher accuracy by Fx to Mz. This is because capacitance values (areas of the electrodes) that are used for measurement of force are larger as compared to the case of Fx' to Mz' or Fx" to Mz" and thus variations of capacitance values are also large, resulting in advantage from the perspective of S/N.

Alternatively, a C/V convertor and a signal processing unit may be included in every capacitive element as in the second embodiment described in § 2; however, the force sensor of the present embodiment includes as many as sixteen capacitive elements and thus calculation becomes complicated. This is thus not realistic. As described above, therefore, it is desirable to employ a circuit configuration that performs arithmetic processing using a microcomputer.

Figure 19:
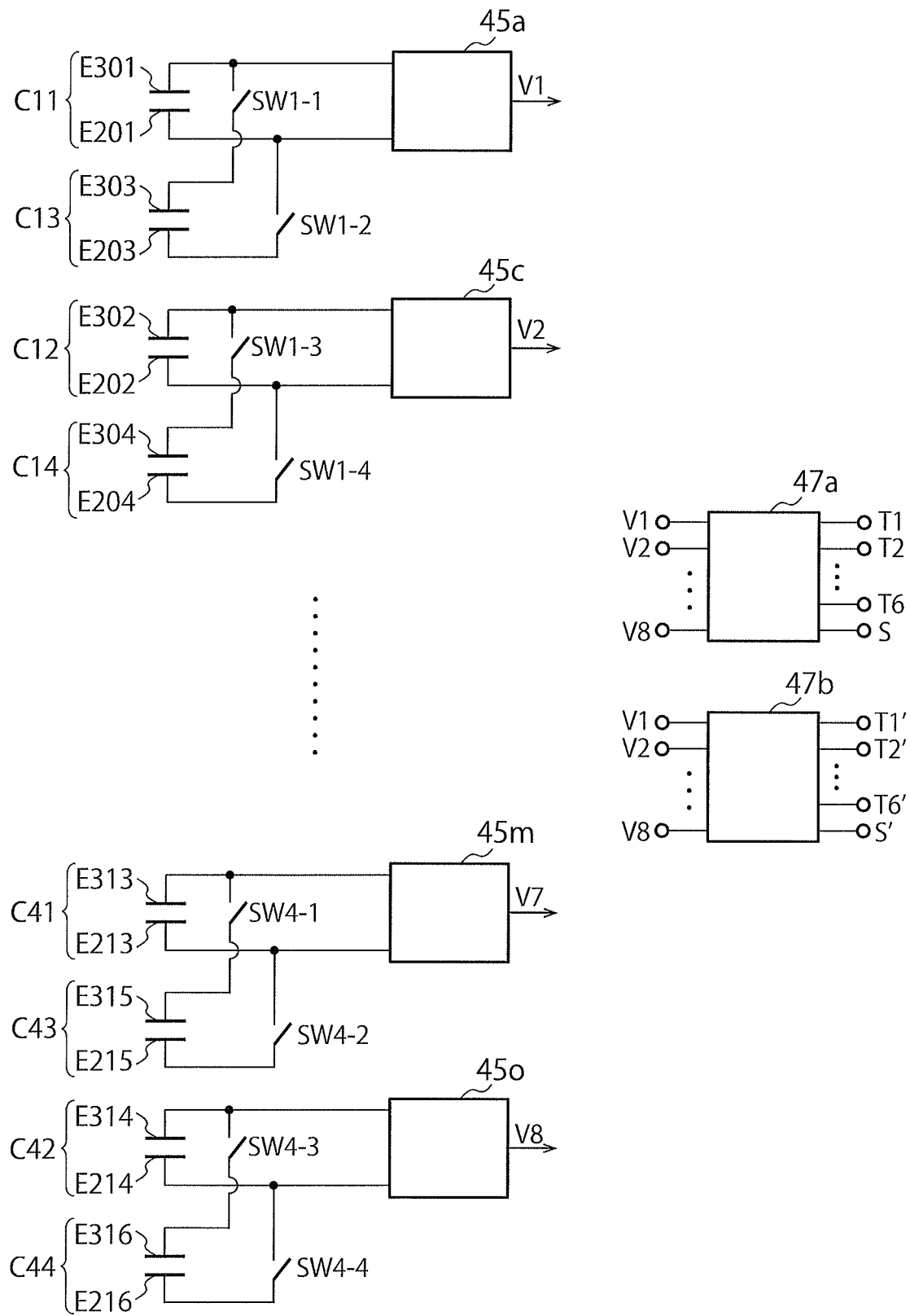
FIG. 19 is a circuit diagram illustrating another exemplary detection circuit used in the force sensor in FIG. 10.
Figures 20, 21:
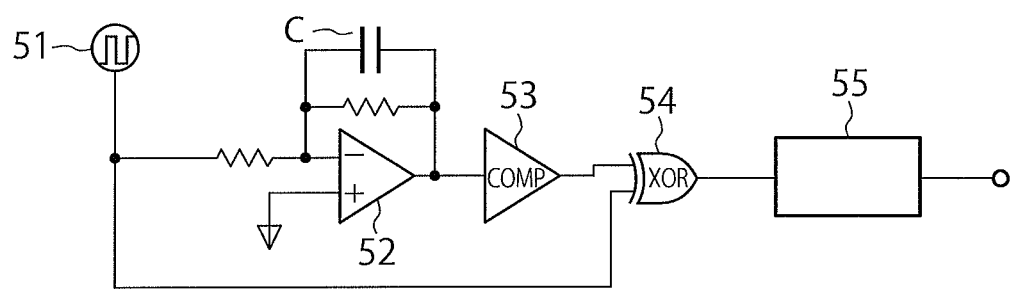
FIG. 20 is a table illustrating ON/OFF connection states of switches included in the detection circuit in FIG. 19.
FIG. 21 is a circuit diagram where a PWM circuit is provided to a capacitive element.

The detection circuit illustrated in FIG. 17 is capable of calculating both of Fx', Fy', Fz', Mx', My', and Mz' presented in [Mathematical Formulas 8] and Fx", Fy", Fz", Mx", My", and Mz" presented in [Mathematical Formulas 9]; however, if either one thereof is calculated, the detection circuit can be configured more simply. An example of such a detection circuit is illustrated in FIG. 19. FIG. 19 is a circuit diagram illustrating another exemplary detection circuit used in the force sensor in FIG. 10. FIG. 20 is a table illustrating ON/OFF connection states of switches included in the detection circuit in FIG. 19.

The detection circuit in FIG. 19 is equivalent to the detection circuit in FIG. 17 excluding the second, the fourth, the sixth, the eighth, the tenth, the twelfth, the fourteenth, and the sixteenth C/V convertors and A/D convertors 45b, 45d, 45f, 45h, 45j, 45l, 45n, and 45p. When switches SW11 to SW44 are all turned on as described in a column of timing 1 in FIG. 20, this detection circuit becomes equivalent to the detection circuit in FIG. 17 where the switches SW11 to SW44 and SW101 to SW116 in FIG. 17 are in the connection states as described in the column of the timing 1 in FIG. 18. That is, the first and the second microcomputers 47a and 47b can calculate the six components Fx, Fy, Fz, Mx, My, and Mz of force acting described in [Mathematical Formulas 7]. When all of the switches SW11 to SW44 are turned off as described in a column of timing 2 in FIG. 20, an output signal V1 corresponding to "C11", an output signal V2 corresponding to "C12", an output signal V3 corresponding to "C21", an output signal V4 corresponding to "C22", an output signal V5 corresponding to "C31", an output signal V6 corresponding to "C32", an output signal V7 corresponding to "C41", and an output signal V8 corresponding to "C42" are provided to each of the first microcomputer 47a and the second microcomputer 47b. This allows the first and the second microcomputers 47a and 47b to calculate the six components of force Fx", Fy", Fz", Mx", My", and Mz" described in [Mathematical Formulas 9] based on the respective output signals V1 to V8.

Of course if connection states of the switches in the detection circuit in FIG. 17 are fixed to the timing 2 in FIG. 18, the first to sixteenth C/V convertors and A/D convertors 45a to 45p detect capacitance values of the capacitive elements C11 to C44 corresponding thereto. The respective capacitance values of these capacitive elements may be input to the first and the second microcomputers 47a and 47b and the first and the second microcomputers 47a and 47b may calculate the components Fx to Mz, Fx' to Mz', and Fx" to Mz" based on [Mathematical Formulas 7] to [Mathematical Formulas 9].

According to the force sensor of the present embodiment as described above, the components Fx to Mz of force measured using all of the capacitive elements C11 to C44 can be compared to the components Fx' to Mz' or Fx" to Mz" of force measured using a part of the capacitive elements and thus the force sensor itself can determine whether the force sensor is normally functioning. This allows for providing a force sensor capable of determining a failure (determination as to whether normally functioning) without using a plurality of force sensors, in other words, while minimizing cost and an installment space.

Each the four pairs of capacitive elements corresponding to the four first deformation parts 111 to 114 is symmetrically arranged with respect to X axis or the Y axis at an equivalent distance from the origin and thus it is easy to perform processing for measuring force to be detected based on variations of capacitance values of the capacitive elements.

Note that the example where the four displacement electrodes are included in each of the four first deformation parts 111 to 114; however, an embodiment of the present invention is not limited to such an example. For example, the displacement electrodes may be included as one common electrode in each of the four first deformation parts 111 to 114. In this case, for example the first deformation part 111 may include four fixed electrodes E201 to E204 symmetrically arranged with respect to the Y axis as described above and these fixed electrodes E201 to E204 and the common electrode may form four capacitive elements C11 to C14. The above also applies the capacitive elements C21 to C44 corresponding to the remaining three first deformation parts 112 to 114. Alternatively, the four first deformation parts 111 to 114 may be made of a conductive material (for example a metal material such as stainless steel, aluminum, or titan) and the four first deformation parts 111 to 114 may function as a common electrode.

Alternatively, the capacitive elements C11 to C44 may be formed by configuring the fixed electrodes by a common electrode and including four displacement electrodes in each of the four first deformation parts 111 to 114 symmetrically with respect to the X axis or the Y axis.

Although not illustrated, an area of one of the fixed electrode and the displacement electrode may be set larger than an area of the other such that an effective facing area of the pair of electrodes forming each of the capacitive elements does not change even when a relative position of the displacement electrode relative to the fixed electrode changes as a result of an action of a force in each of the axial directions or a moment around each of the axes. As described earlier, this is a state where a projected image of the electrode having a smaller area (e.g. displacement electrode) is completely included within a surface of the other electrode having a larger area (e.g. fixed electrode) when a contour of the electrode having the smaller area is projected on the surface of the electrode having the larger area and thereby an orthogonal projection is formed. When this state is maintained, an effective area of the capacitive element formed by the electrodes is equivalent to an area of the smaller electrode and thus is always constant. That is, a detection accuracy of force can be enhanced.

<<<§ 4. Exemplary Variation of Detection Circuit Using PWM Conversion Circuit>>>

The force sensor having been explained selectively connects predetermined capacitive elements in parallel by switching ON/OFF of the switches at predetermined timing and thereby performs addition operation of the capacitance values. As the switches, a switch having a mechanical contact point may be employed; however, from the perspective of downsizing a circuit substrate of the detection circuit, it is preferable to employ an analog switch.

In an analog switch, however, a parasitic capacitance exists at a terminal for input or output and this parasitic capacitance may be disadvantageously larger than the capacitance value of the capacitive element. In this case, the capacitance value cannot be accurately evaluated and thus an accuracy of force or moment detected by the force sensor disadvantageously decreases. It is thus desirable to perform addition operation of the capacitance values of predetermined capacitive elements not by using an analog switch but by using an electronic circuit. In order to convert the capacitance value of the capacitive element into an electrical signal, a circuit to convert the magnitude of the capacitance value into a voltage (C/V convertor), a circuit to convert the magnitude into a frequency (C/f convertor), a circuit to convert the magnitude into a pulse width (pulse width modulation (PWM) circuit), or other circuits may be used. As an example, a method for converting the capacitance value into a pulse wave using a PWM circuit and measuring the width of the pulse wave by a counter of a microcomputer will be described based on FIGS. 21 to 24.

Figure 22:
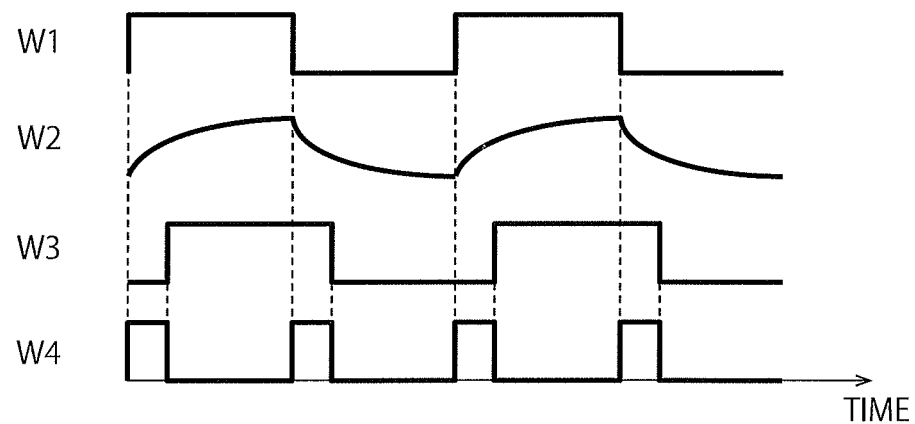
FIG. 22 is a schematic diagram illustrating waveforms of signals output from respective components of the PWM circuit in FIG. 21.

FIG. 21 is a circuit diagram where a PWM circuit is provided to a capacitive element. FIG. 22 is a schematic diagram illustrating waveforms of signals output from respective components of the PWM circuit in FIG. 21.

As illustrated in FIGS. 21 and 22, a PWM circuit in the present circuit diagram includes: a driving unit 51 that provides rectangular driving pulse waves W1 to a capacitive element C; a low pass filter 52 connected to the capacitive element C in parallel; a comparator 53 that converts the waveform of waves W2 having passed the low pass filter 52 into rectangular waves W3; an operation unit 54 that performs logical operation of an exclusive OR of driving pulse waves W1 provided by the driving unit 51 and the rectangular waves W3 converted into by the comparator 53; and a counter 55 that measures a pulse width of pulse waves W4 after operation by the operation unit 54.

In this PWM circuit, as illustrated in FIG. 22, the driving pulse waves W1 having passed the low pass filter 52 include waveform rounding due to delayed transfer of the driving pulse waves W1 by the capacitive element C. There is a characteristic that a degree of this rounding is larger as a capacitance value of the capacitive element C is larger. Therefore, when the waves W2 having passed the low pass filter 52 are converted into the rectangular waves W3 by the comparator 53, the rectangular waves W3 are delayed by time corresponding to the capacitance value of the capacitive element C with respect to the driving pulse waves W1 provided by the driving unit 51. Therefore, measuring the pulse width of the pulse waves W4 obtained by exclusive OR of the driving pulse waves W1 and the rectangular waves W3 allows for evaluating the capacitance value of the capacitive element C.

Figure 23:
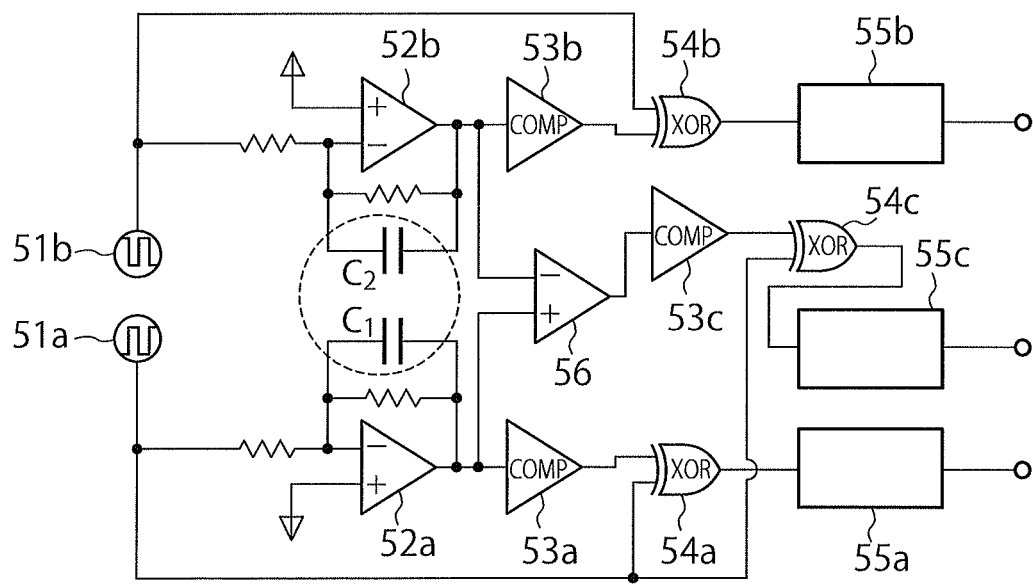
FIG. 23 is a circuit diagram illustrating an exemplary PWM circuit that may be employed in a force sensor of the present invention.
Figure 24:
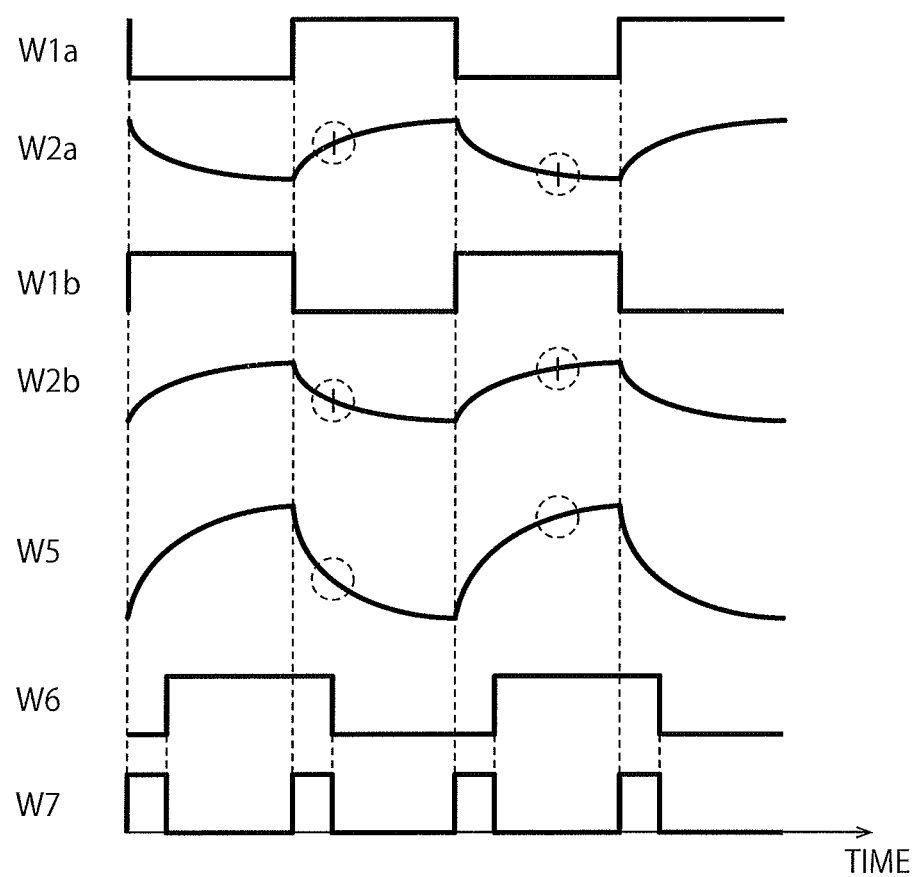
FIG. 24 is a schematic diagram illustrating waveforms of signals output from respective components of the PWM circuit in FIG. 23.

For employing the PWM circuit as described above in a force sensor according to the present invention, for example a circuit diagram illustrated in FIG. 23 is configured. FIG. 23 is a circuit diagram illustrating an exemplary PWM circuit that may be employed in a force sensor of the present invention. FIG. 24 is a schematic diagram illustrating waveforms of signals output from respective components of the PWM circuit in FIG. 23.

The PWM circuit illustrated in FIG. 23 includes two of the PMW circuits illustrated in FIG. 21 arranged in parallel and thus common components are denoted with similar symbols to those in FIG. 21 while detailed descriptions thereon are omitted. Meanwhile in the PWM circuit illustrated in FIG. 23, unlike in the PWM circuit illustrated in FIG. 21, waves W2a and W2b having passed low pass filters 52a and 52b are input to comparators 53a and 53b as well as a subtraction arithmetic unit 56. Thereafter waves W5 output from the subtraction arithmetic unit 56 are shaped into rectangular waves W6 by a comparator 53c and these rectangular waves W6 are input to an operation unit 54c that calculates exclusive OR together with driving pulse waves W1a provided by the driving unit 51a. Waves W7 calculated by the operation unit 54c are then input to a counter 55c, thereby the pulse width of the waves W7 is measured.

Note that, in the circuit diagram illustrated, two types of driving pulse waves W1a and W1b have opposite phases. Therefore the subtraction arithmetic unit 56 performs operation of "W2a−W2b". However, addition operation of "W2a+W2b" is actually performed. That is, when the present PWM circuit is applied to two capacitive elements C1 and C2, for example, a signal based on the capacitive element C1 is output from a counter 55a and a signal based on the capacitive element C2 is output from a counter 55b. A signal of the sum of capacitances of the two capacitive elements C1 and C2 (C1+C2) is output from the counter 55c.

In order to employ the above PWM circuit in the six-axis force sensor described in § 3, for example, it is only required to divide the sixteen capacitive elements C11 to C44 into eight pairs of two capacitive elements including the capacitive elements C12 and C14, the capacitive elements C11 and C13, the capacitive elements C22 and C24, the capacitive elements C21 and C23, the capacitive elements C32 and C34, the capacitive elements C31 and C33, the capacitive elements C42 and C44, and the capacitive elements C41 and C43 and to employ the PWM circuit in each of the pairs. According to such a circuit configuration, capacitance values "C12" and "C14" of the capacitive elements C12 and C14 and the sum of the capacitance values "C12+C14" can be measured from the circuit including the capacitive elements C12 and C14. Similarly, capacitance values "C11" and "C13" of the capacitive elements C11 and C13 and the sum of the capacitance values "C11+C13" can be measured from the circuit including the capacitive elements C11 and C13. Capacitance values "C22" and "C24" of the capacitive elements C22 and C24 and the sum of the capacitance values "C22+C24" can be measured from the circuit including the capacitive elements C22 and C24. Capacitance values "C21" and "C23" of the capacitive elements C21 and C23 and the sum of the capacitance values "C21+C23" can be measured from the circuit including the capacitive elements C21 and C23. Capacitance values "C32" and "C34" of the capacitive elements C32 and C34 and the sum of the capacitance values "C32+C34" can be measured from the circuit including the capacitive elements C32 and C34. Capacitance values "C31" and "C33" of the capacitive elements C31 and C33 and the sum of the capacitance values "C31+C33" can be measured from the circuit including the capacitive elements C31 and C33. Capacitance values "C42" and "C44" of the capacitive elements C42 and C44 and the sum of the capacitance values "C42+C44" can be measured from the circuit including the capacitive elements C42 and C44. Capacitance values "C41" and "C43" of the capacitive elements C41 and C43 and the sum of the capacitance values "C41+C43" can be measured from the circuit including the capacitive elements C41 and C43. Performing calculation corresponding to the aforementioned [Mathematical Formulas 7] using these measurement results allows for calculating the six components Fx, Fy, Fz, Mx, My, and Mz of force acting on the force sensor. Performing calculation corresponding to the aforementioned [Mathematical Formulas 8] allows for calculating the six components Fx', Fy', Fz', Mx', My', and Mz' of force.

Alternatively, performing calculation corresponding to the aforementioned [Mathematical Formulas 9] also allows for calculating the six components Fx", Fy", Fz", Mx", My", and Mz" of force. Based on these calculation results, whether the force sensor is normally functioning can be evaluated as described in detail in § 3. Similarly, the PWM circuit may be employed in the single-axis force sensor described in § 1 and the dual-axis force sensor described in § 2.

According to the PWM circuit described here, even when in-phase noise (illustrated by broken lines in the waves W2a and W2b in FIG. 24) is mixed in the waves W2a and W2b having passed the low pass filters 52a and 52b, the subtraction arithmetic unit 56 can cancel out the noise as illustrated in a waveform of the waves W5 and thus capacitance values can be measured with a high accuracy. Note that in FIG. 23 three counters 55a, 55b, and 55c are included to concurrently and separately measure "C1", "C2", and "C1+C1"; however, one microcomputer may be employed instead of these counters 55a, 55b, and 55c. In this case, "C1", "C2", and "C1+C1" cannot be concurrently measured but a circuit configuration can be simplified.

The invention claimed is:

1. A force sensor that detects force in a Z axis direction in an X-Y-Z three-dimensional coordinate system, the force sensor comprising:
   a supporting body arranged on an X-Y plane;
   a deformation body arranged opposite to the supporting body and having a deformation substrate elastically deformed by an action of a force to be detected;
   a fixed electrode arranged on the supporting body;
   a displacement electrode provided to the deformation substrate of the deformation body in such a manner as to face the fixed electrode with which it forms a capacitive element; and
   a detection circuit that outputs an electrical signal representing a force acting on one side of the deformation body,
   wherein the displacement electrode comprises a first displacement electrode and a second displacement electrode,
   the fixed electrode comprises a first fixed electrode arranged opposite to the first displacement electrode and a second fixed electrode arranged opposite to the second displacement electrode,
   the capacitive element comprises a first capacitive element arranged in a region including the Z axis when viewed from the Z axis direction and a second capacitive element arranged in such a manner as to encircle the first capacitive element,
   the first capacitive element is formed by the first displacement electrode and the first fixed electrode,
   the second capacitive element is formed by the second displacement electrode and the second fixed electrode,
   the detection circuit outputs, as the electrical signal representing the acting force, a first electrical signal corresponding to a capacitance value of the first capacitive element and a second electrical signal corresponding to a capacitance value of the second capacitive element, and
   the detection circuit determines whether the force sensor is normally functioning based on the first electrical signal and the second electrical signal.

2. The force sensor according to claim 1,
   wherein the first capacitive element has a disk shape when viewed from the Z axis direction, and
   the second capacitive element has a ring shape when viewed from the Z axis direction.

3. The force sensor according to claim 1,
   wherein an area of one of the first fixed electrode and the first displacement electrode is set larger than an area of the other and an area of one of the second fixed electrode and the second displacement electrode is set larger than an area of the other such that an effective facing area of each of the pairs of electrodes forming the first and the second capacitive elements does not change even when a relative position of the displacement electrode changes relative to the fixed electrode as a result of an action of a force in the Z axis direction.

4. The force sensor according to claim 1,
   wherein the detection circuit determines whether the force sensor is normally functioning by determining whether a difference between a force measured based on the first electrical signal and a force measured based on the second electrical signal is within a predetermined range.

5. A force sensor that detects force in a Z axis direction in an X-Y-Z three-dimensional coordinate system, the force sensor comprising:
   a supporting body arranged on an X-Y plane;
   a deformation body arranged opposite to the supporting body and having a deformation substrate elastically deformed by an action of a force to be detected;
   a fixed electrode arranged on the supporting body;
   a displacement electrode provided to the deformation substrate of the deformation body in such a manner as to face the fixed electrode with which it forms a capacitive element; and
   a detection circuit that outputs an electrical signal representing a force acting on one side of the deformation body,
   wherein the displacement electrode comprises a first displacement electrode and a second displacement electrode,
   the fixed electrode comprises a first fixed electrode arranged opposite to the first displacement electrode and a second fixed electrode arranged opposite to the second displacement electrode,
   the capacitive element comprises a first capacitive element arranged in a region including the Z axis when viewed from the Z axis direction and a second capacitive element arranged in such a manner as to encircle the first capacitive element,
   the first capacitive element is formed by the first displacement electrode and the first fixed electrode,
   the second capacitive element is formed by the second displacement electrode and the second fixed electrode,
   the detection circuit outputs, as the electrical signal representing the acting force, a first electrical signal corresponding to a capacitance value of the first capacitive element and a second electrical signal corresponding to a capacitance value of the second capacitive element, and an added electrical signal corresponding to a sum of the capacitance values of the first and second capacitive elements, and
   the detection circuit determines whether the force sensor is normally functioning based on any one of the first electrical signal and the second electrical signal, and the added electrical signal.

6. The force sensor according to claim 5,
wherein the detection circuit determines whether the force sensor is normally functioning by determining whether at least one of (1) a difference between a force measured based on the added electrical signal, where the added electrical signal is the sum of two signals which are outputted by the detection circuit, and a force measured based on the first electrical signal or (2) a difference between the force measured based on the added electrical signal and a force measured based on the second electrical signal is within a predetermined range.

7. The force sensor according to claim 5,
wherein the detection circuit outputs, as the electrical signal representing the acting force, both of the first electrical signal and the second electrical signal, and
the detection circuit determines whether the force sensor is normally functioning by determining whether at least one of (1) a difference between a force measured based on the added electrical signal, where the added electrical signal is the sum of two signals which are outputted by the detection circuit, and a force measured based on the first electrical signal, (2) a difference between the force measured based on the added electrical signal and a force measured based on the second electrical signal, or (3) a difference between the force measured based on the first electrical signal and the force measured based on the second electrical signal are within a predetermined range.

* * * * *